(12) United States Patent
Xue et al.

(10) Patent No.: US 11,216,661 B2
(45) Date of Patent: Jan. 4, 2022

(54) IMAGING SYSTEM AND METHOD FOR UNMANNED VEHICLES

(71) Applicant: SZ DJI TECHNOLOGY CO., LTD., Shenzhen (CN)

(72) Inventors: Bing Xue, Shenzhen (CN); Zhongqian You, Shenzhen (CN); Di Ou, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/003,418

(22) Filed: Jun. 8, 2018

(65) Prior Publication Data
US 2018/0295272 A1 Oct. 11, 2018

Related U.S. Application Data

(63) Continuation of application No. PCT/CN2015/096744, filed on Dec. 9, 2015.

(51) Int. Cl.
| | |
|---|---|
| H04N 5/232 | (2006.01) |
| H04N 13/204 | (2018.01) |
| G06K 9/00 | (2006.01) |
| G05D 1/00 | (2006.01) |
| B64C 39/02 | (2006.01) |
| G06T 11/00 | (2006.01) |
| G06K 9/36 | (2006.01) |
| G03B 15/00 | (2021.01) |

(52) U.S. Cl.
CPC .......... *G06K 9/0063* (2013.01); *B64C 39/024* (2013.01); *G03B 15/006* (2013.01); *G05D 1/0038* (2013.01); *G06K 9/36* (2013.01); *G06T 11/00* (2013.01); *H04N 5/23203* (2013.01); *H04N 5/23206* (2013.01); *H04N 5/23248* (2013.01); *H04N 5/23299* (2018.08); *H04N 13/204* (2018.05); *B64C 2201/127* (2013.01); *B64C 2201/146* (2013.01)

(58) Field of Classification Search
CPC ............ H04N 5/23206; H04N 13/204; G06K 9/0063; B64C 39/024; B64C 2201/127; B64C 2201/146; G05D 1/0038
USPC ......................................................... 348/114
See application file for complete search history.

(56) References Cited

U.S. PATENT DOCUMENTS

| | | | |
|---|---|---|---|
| 9,019,376 B2 | 4/2015 | Lee et al. | |
| 9,533,760 B1* | 1/2017 | Wagreich | ............... H04N 5/247 |
| 10,222,795 B2* | 3/2019 | Margolin | ............. G05D 1/0038 |

(Continued)

FOREIGN PATENT DOCUMENTS

| | | |
|---|---|---|
| CN | 101421747 A | 4/2009 |
| CN | 103561244 A | 2/2014 |

(Continued)

OTHER PUBLICATIONS

The World Intellectual Property Organization (WIPO) International Search Report and Written Opinion for PCT/CN2015/096744 dated Sep. 6, 2016 10 Pages.

*Primary Examiner* — Zaihan Jiang
(74) *Attorney, Agent, or Firm* — Anova Law Group, PLLC

(57) ABSTRACT

An aerial imaging system for transferring pictures captured from a plurality of imaging devices includes an aerial node. The aerial node has a plurality of channels for acquiring the pictures from the imaging devices and is configured to transfer the pictures.

18 Claims, 19 Drawing Sheets

(56) References Cited

U.S. PATENT DOCUMENTS

| | | | | |
|---|---|---|---|---|
| 10,499,037 | B1* | 12/2019 | Wilcox | H04N 17/002 |
| 2014/0350748 | A1* | 11/2014 | Fisher | B64D 47/08 |
| | | | | 701/2 |
| 2015/0120094 | A1* | 4/2015 | Kimchi | G05D 1/00 |
| | | | | 701/3 |
| 2016/0063987 | A1* | 3/2016 | Xu | H04R 3/005 |
| | | | | 381/71.12 |
| 2016/0076892 | A1* | 3/2016 | Zhou | B64D 47/08 |
| | | | | 701/3 |
| 2016/0292865 | A1* | 10/2016 | Floor | H04N 5/247 |
| 2016/0306355 | A1* | 10/2016 | Gordon | G08G 5/006 |
| 2017/0053169 | A1* | 2/2017 | Cuban | B64C 39/024 |
| 2017/0092109 | A1* | 3/2017 | Trundle | H04B 7/18504 |
| 2017/0094258 | A1* | 3/2017 | Cooper | H04N 5/23245 |
| 2017/0158353 | A1* | 6/2017 | Schmick | G05D 1/0033 |
| 2018/0118337 | A1* | 5/2018 | Viel | B08B 1/002 |
| 2018/0134387 | A1* | 5/2018 | Kovac | B64D 1/18 |
| 2018/0237158 | A1* | 8/2018 | Liang | B64C 39/024 |
| 2018/0253092 | A1* | 9/2018 | Trapero Esteban | H04W 12/06 |
| 2018/0265194 | A1* | 9/2018 | Gauglitz | G05D 1/0016 |
| 2018/0273173 | A1* | 9/2018 | Moura | G01N 25/72 |
| 2019/0023392 | A1* | 1/2019 | Micros | B64C 33/025 |

FOREIGN PATENT DOCUMENTS

| | | |
|---|---|---|
| CN | 204068025 U | 12/2014 |
| CN | 104506868 A | 4/2015 |
| CN | 104539905 A | 4/2015 |
| CN | 204291244 U | 4/2015 |
| CN | 204539340 U | 8/2015 |
| CN | 204795454 U | 11/2015 |
| CN | 105120011 A | 12/2015 |

\* cited by examiner

IMAGING SYSTEM AND METHOD FOR UNMANNED VEHICLES

CROSS-REFERENCE TO RELATED APPLICATION

This application is a continuation of International Application No. PCT/CN2015/096744, filed on Dec. 9, 2015, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosed embodiments relate generally to imaging systems and more particularly, but not exclusively, to imaging systems for aerial platforms.

BACKGROUND

In recent years, Unmanned Aerial Vehicles ("UAVs") have been utilized widely in the area of aerial imaging due to their low costs and easiness to operate. For ideal imaging results, multiple imaging devices are needed for capturing pictures from different angles or directions.

However, currently-available UAVs usually equip only one picture transferring system with a single channel because of limitations of costs, weight and room space of the UAV. This channel is usually used for a functional purpose other than operating the UAV. As a result, the UAV can transfer only pictures captured by one imaging device, in real-time, for presentation. Use of the single imaging device is very inconvenient and unsafe for operating the UAV.

As an example, currently-available aerial imaging systems allow a dual-control mode, which permits a pilot to control the UAV and another operator to operate the imaging device. Inconveniently, both operators rely on pictures captured by the imaging device and transferred via the single channel for selecting a travel path. Use of dual-control mode, however, makes it difficult, if not impossible, to satisfy job requirements of both operators because both must share the pictures captured via the single imaging device. Sharing the pictures captured via the single imaging device, for example, causes interference between the two operators. The interference is especially prevalent when the operators are a long distance from the UAV. In such scenario, if the UAV operator relies on the pictures captured with the single imaging device, the UAV can easily lose its direction or collide with a person or an obstacle.

When a direction of the imaging device is controlled based upon functional imaging needs, for example, an orientation of the imaging device may be different from the navigation direction of the UAV. Controlling the UAV thus may be more difficult. In another scenario, when surrounded by obstacles, the UAV can impact an obstacle because the imaging device may not provide a picture of obstacles in front of the UAV. In addition, it is further difficult to provide the UAV with an optimal travel path and/or an imaging angle for the functional imaging purpose of the imaging device.

In view of the foregoing reasons, there is a need for an aerial imaging system and method for capturing, transferring and presenting pictures from multiple imagine devices.

SUMMARY

In accordance with a first aspect disclosed herein, there is set forth an aerial imaging system for transferring pictures captured from a plurality of imaging devices, comprising:
an aerial node having a plurality of channels for acquiring the pictures from the imaging devices,
wherein the aerial node is configured to transfer the pictures.

In an exemplary embodiment of the disclosed aerial imaging systems, the aerial node comprises a picture acquiring module for acquiring the pictures from the channels.

In another exemplary embodiment of the disclosed aerial imaging systems, the aerial node comprises a picture encoding module for encoding the collected pictures from the plurality of channels.

In another exemplary embodiment of the disclosed aerial imaging systems, the captured pictures are encoded in accordance with a MPEG-4 Part 10 protocol or an Advanced Video Coding ("H.264") protocol.

In another exemplary embodiment of the disclosed aerial imaging systems, the picture encoding module is configured to generate a bitstream of pictures for each of the channels.

In another exemplary embodiment of the disclosed aerial imaging systems, the aerial node comprises a wireless transferring module for transferring the bitstreams to another node.

In another exemplary embodiment of the disclosed aerial imaging systems, the bitstreams are transferred in accordance with a public protocol or a proprietary protocol.

In another exemplary embodiment of the disclosed aerial imaging systems, at least two of the pictures collected respectively via at least two of the channels constitute a three-dimensional picture of an object.

In another exemplary embodiment of the disclosed aerial imaging systems, the aerial node is arranged on an unmanned aerial vehicle ("UAV").

Exemplary embodiments of the disclosed aerial imaging systems further comprise a ground node for presenting the captured pictures.

In another exemplary embodiment of the disclosed aerial imaging systems, the ground node comprises a wireless receiving module for receiving the bitstreams for each of the channels from the aerial node.

In another exemplary embodiment of the disclosed aerial imaging systems, the wireless receiving module is configured to receive bitstreams from one or more of the aerial nodes.

In another exemplary embodiment of the disclosed aerial imaging systems, the ground node comprises a picture decoding module for decoding the bitstreams for each of the channels.

In another exemplary embodiment of the disclosed aerial imaging systems, the picture decoding module is configured to decode the bitstreams in accordance with a MPEG-4 Part 10 or an advanced video coding ("H.264") protocol.

In another exemplary embodiment of the disclosed aerial imaging systems, the ground node comprises a picture presenting module for presenting the decoded bitstreams.

In another exemplary embodiment of the disclosed aerial imaging systems, the picture presenting module is configured to select one or more channels of the decoded bitstreams for presentation.

In another exemplary embodiment of the disclosed aerial imaging systems, the picture presenting module is configured to select particular channels in accordance with a user selection.

In another exemplary embodiment of the disclosed aerial imaging systems, the picture presenting module is configured to present the selected channels.

In another exemplary embodiment of the disclosed aerial imaging systems, the picture presenting module is configured to present the selected decoded bitstreams in a picture-in-picture format, a picture-by-picture format or a picture-on-picture format.

In another exemplary embodiment of the disclosed aerial imaging systems, the picture presenting module is configured to present the selected decoded bitstreams with an app of an intelligent terminal.

In another exemplary embodiment of the disclosed aerial imaging systems, the picture presenting module is configured to enable any selected pictures to be presented in an adjustable manner.

In another exemplary embodiment of the disclosed aerial imaging systems, the adjustable manner comprises enabling at least one of a location, a size and a quality of the selected pictures to be adjusted.

In another exemplary embodiment of the disclosed aerial imaging systems, the plurality of imaging devices comprises:

a first imaging device arranged on the UAV for supporting operation of the UAV; and a second imaging device arranged on the UAV for functional and/or navigational purposes.

In another exemplary embodiment of the disclosed aerial imaging systems, the first imaging device comprises a first-person view ("FPV") imaging device for capturing first pictures in a first-person view.

In another exemplary embodiment of the disclosed aerial imaging systems, the second imaging device comprises a functional imaging device.

In another exemplary embodiment of the disclosed aerial imaging systems, the first imaging device is positioned at a front portion of the UAV.

In another exemplary embodiment of the disclosed aerial imaging systems, the first imaging device is associated with a first gimbal configured to control an orientation of the first imaging device.

In another exemplary embodiment of the disclosed aerial imaging systems, the first gimbal is a one-dimensional stabilized gimbal or a three-dimensional stabilized gimbal.

In another exemplary embodiment of the disclosed aerial imaging systems, the first gimbal is enabled to rotate about at least a pitch axis of the UAV.

In another exemplary embodiment of the disclosed aerial imaging systems, the first gimbal is configured to operate under at least one of a following mode, an FPV mode, a free mode and a gimbal return mode.

In another exemplary embodiment of the disclosed aerial imaging systems, the first imaging device is configured to capture a plurality of first pictures in respective directions from the UAV.

In another exemplary embodiment of the disclosed aerial imaging systems, the captured first pictures support determination of a travel path for the UAV.

In another exemplary embodiment of the disclosed aerial imaging systems, the first imaging device supports navigation of the UAV.

In another exemplary embodiment of the disclosed aerial imaging systems, the functional imaging device is positioned at a front portion, a front portion, a side portion or a lower portion of the UAV.

In another exemplary embodiment of the disclosed aerial imaging systems, the functional imaging device is associated with a second gimbal for controlling an orientation of the functional imaging device.

In another exemplary embodiment of the disclosed aerial imaging systems, the functional imaging device is configured to conduct at least one of capturing ambient images, monitoring surroundings of the UAV, and searching and rescuing.

In another exemplary embodiment of the disclosed aerial imaging systems, the second gimbal is configured to rotate about up to three axes.

In another exemplary embodiment of the disclosed aerial imaging systems, the second gimbal comprises a stabilization capacity.

In another exemplary embodiment of the disclosed aerial imaging systems, the second gimbal operates under at least one of an FPV mode, a following mode, a free mode and a gimbal return mode.

In another exemplary embodiment of the disclosed aerial imaging systems, the second imaging device comprises a wide-angle lens for capturing a second picture in a larger view.

In another exemplary embodiment of the disclosed aerial imaging systems, the first and second gimbals cooperate for working under an FPV-plus-free mode or an FPV-plus-following mode.

In another exemplary embodiment of the disclosed aerial imaging systems, the second pictures are configured to assist in operating the UAV.

In another exemplary embodiment of the disclosed aerial imaging systems, the second imaging device is configured to provide a view for purposes of navigation and/or functional imaging.

In another exemplary embodiment of the disclosed aerial imaging systems, the second imaging device supports navigation of the UAV.

In another exemplary embodiment of the disclosed aerial imaging systems, the first and second pictures are configured for a purpose selected from a group consisting of determining a position of the UAV, determining a travel direction, selecting an optimal travel path and avoiding obstacles.

In another exemplary embodiment of the disclosed aerial imaging systems, the optimal travel path is determined based on functional requirements of the functional imaging device.

In another exemplary embodiment of the disclosed aerial imaging systems, the optimal travel path is selected based on an operational requirement for a future task assigned to the UAV.

In accordance with another aspect disclosed herein, there is set forth a method for transferring pictures from an aerial platform, comprising:

acquiring pictures from a plurality of imaging devices via a plurality of channels; and transferring the pictures acquired via at least two of the channels.

Exemplary embodiments of the disclosed methods further comprise encoding the pictures for each of the channels.

In an exemplary embodiment of the disclosed methods, encoding the pictures comprises encoding the pictures in accordance with a MPEG-4 Part 10 protocol or an Advanced Video Coding ("H.264") protocol.

In another exemplary embodiment of the disclosed methods, encoding the pictures comprises generating a bitstream of pictures for each of the channels.

Exemplary embodiments of the disclosed methods further comprise transferring the bitstreams to another node.

In another exemplary embodiment of the disclosed methods, transferring the bitstreams comprises transferring the bitstreams in accordance with a public protocol or a proprietary protocol.

In another exemplary embodiment of the disclosed methods, acquiring pictures comprises acquiring at least two of the pictures, each from a separate channel and each being part of a three-dimensional picture of an object.

In another exemplary embodiment of the disclosed methods, the aerial platform is an unmanned aerial vehicle ("UAV").

Exemplary embodiments of the disclosed methods further comprise:

receiving the bitstreams from each of the plurality of channels at a ground node.

Exemplary embodiments of the disclosed methods further comprise decoding the bitstreams for each of the channels at the ground node.

In another exemplary embodiment of the disclosed methods, decoding the bitstreams comprises decoding the bitstreams in accordance with a MPEG-4 Part 10 protocol or an advanced video coding ("H.264") protocol.

Exemplary embodiments of the disclosed methods further comprise selecting one or more channels of the decoded bitstreams for presentation.

In another exemplary embodiment of the disclosed methods, selecting the channels comprises selecting particular channels in accordance with a user selection.

Exemplary embodiments of the disclosed methods further comprise presenting the selected channels at the ground node.

In another exemplary embodiment of the disclosed methods, presenting the bitstream comprises presenting the selected decoded bitstreams.

In another exemplary embodiment of the disclosed methods, presenting the selected decoded bitstreams comprises displaying the selected decoded bitstreams in a picture-in-picture format, picture-by-picture format or a picture-on-picture format.

In another exemplary embodiment of the disclosed methods, presenting the selected decoded bitstreams comprises displaying the selected decoded bitstreams via an intelligent terminal.

In another exemplary embodiment of the disclosed methods, presenting the decoded bitstreams comprises enabling any selected pictures to be presented in an adjustable manner.

In another exemplary embodiment of the disclosed methods, enabling the selected pictures to be presented in the adjustable manner comprises enabling at least one of a location, a size and a quality of the selected pictures to be adjusted.

In another exemplary embodiment of the disclosed methods, presenting the bitstream comprises combining two pictures, each being part of a three-dimensional picture, in two separate channels into a respective three-dimensional picture.

In another exemplary embodiment of the disclosed methods, presenting the bitstreams comprises presenting the three-dimensional picture.

In another exemplary embodiment of the disclosed methods, acquiring the pictures comprises capturing the pictures from multiple imaging devices, each being connected to one of the channels.

In another exemplary embodiment of the disclosed methods, capturing the pictures from multiple imaging devices comprises capturing first pictures with a first imaging device for supporting operation of the UAV.

In another exemplary embodiment of the disclosed methods, capturing the pictures from multiple imaging devices comprises capturing second pictures for functional and/or navigational purposes with a second imaging device arranged on the UAV.

In another exemplary embodiment of the disclosed methods, capturing the first pictures comprises capturing the first pictures with a first-person view ("FPV") imaging device for capturing first pictures in a first-person view for operating the UAV.

In another exemplary embodiment of the disclosed methods, capturing the second pictures comprises capturing the second pictures with a functional imaging device.

Exemplary embodiments of the disclosed methods further comprise arranging the first imaging device on the UAV.

In another exemplary embodiment of the disclosed methods, arranging the first imaging device comprises positioning the first imaging device at a front portion of the UAV.

In another exemplary embodiment of the disclosed methods, arranging the first imaging device comprises associating the first imaging device with a first gimbal configured to control an orientation of the first imaging device.

In another exemplary embodiment of the disclosed methods, associating the first imaging device with the first gimbal comprises attaching the first imaging device to a one-dimensional stabilized gimbal or a three-dimensional stabilized gimbal.

In another exemplary embodiment of the disclosed methods, attaching the imaging device comprises enabling the first gimbal to rotate about at least a pitch axis of the UAV.

In another exemplary embodiment of the disclosed methods, enabling the first gimbal comprises enabling the first gimbal to operate under at least one of an FPV mode, a following mode, a free mode and a gimbal return mode.

In another exemplary embodiment of the disclosed methods, capturing the first pictures comprises capturing the first pictures in respective directions from the UAV.

In another exemplary embodiment of the disclosed methods, supporting the operation of the UAV comprises determining a travel path for the UAV using the captured first pictures.

In another exemplary embodiment of the disclosed methods, capturing the second pictures comprises positioning the functional imaging device at a front portion, a front portion, a side portion or a lower portion of the UAV.

In another exemplary embodiment of the disclosed methods, capturing the second pictures comprises associating the functional imaging device with a second gimbal configured to control an orientation of the functional imaging device.

In another exemplary embodiment of the disclosed methods, capturing the second pictures for functional purposes comprises capturing the second pictures for at least one of a purpose selected from a group consisting capturing ambient images, monitoring surroundings of the UAV, and searching and rescuing.

In another exemplary embodiment of the disclosed methods, associating the functional imaging device with the second gimbal comprises attaching the functional imaging device to a three-dimensional gimbal.

In another exemplary embodiment of the disclosed methods, attaching the functional imaging device comprises enabling the second gimbal with three-dimensional stabilization capacity.

In another exemplary embodiment of the disclosed methods, enabling the second gimbal comprises enabling the second gimbal to operate under at least one of an FPV mode, a following mode, a free mode and a gimbal return mode.

In another exemplary embodiment of the disclosed methods, capturing the second pictures comprises capturing a second picture in a larger view with a wide-angle lens.

In another exemplary embodiment of the disclosed methods, capturing the second pictures comprises capturing the second pictures for assisting in operating the UAV.

Exemplary embodiments of the disclosed methods further comprise enabling the first and the second gimbals to cooperate for working under an FPV-plus-free mode or an FPV-plus-following mode.

Exemplary embodiments of the disclosed methods further comprise capturing the first pictures and/or the second pictures for a purpose selected from a group consisting of determining a position of the UAV, determining a travel direction, selecting an optimal travel path and avoiding obstacles.

In another exemplary embodiment of the disclosed methods, selecting the optimal travel path comprises determining the path based on functional requirements of the functional imaging device.

In another exemplary embodiment of the disclosed methods, determining the optimal travel path comprises determining the optimal travel path based on an operational requirement for a next task assigned to the functional imaging device.

In accordance with another aspect disclosed herein, there is set forth an imaging system for an unmanned aerial vehicle ("UAV"), comprising:
a plurality of imaging devices arranged on the UAV for capturing pictures from the UAV; and
an aerial node for transferring the pictures captured by the plurality of imaging devices.

In an exemplary embodiment of the disclosed imaging systems, the aerial node comprises a picture acquiring module for acquiring pictures from the plurality of imaging devices via a plurality of channels.

In an exemplary embodiment of the disclosed imaging systems, each of the imaging devices is connected to the picture acquiring module via a separate channel selected from the plurality channels.

In an exemplary embodiment of the disclosed imaging systems, the aerial node comprises a picture encoding module for encoding the pictures for each of the channels.

In an exemplary embodiment of the disclosed imaging systems, the pictures are encoded in accordance with a MPEG-4 Part 10 protocol or an advanced video coding ("H.264") protocol.

In an exemplary embodiment of the disclosed imaging systems, the picture encoding module is configured to generate a bitstream of pictures for each of the channels.

In an exemplary embodiment of the disclosed imaging systems, the aerial node comprises a wireless transferring module for transferring the bitstreams for the channels to one or more ground nodes.

In an exemplary embodiment of the disclosed imaging systems, the bitstreams are transferred in accordance with a public protocol or a proprietary protocol.

In an exemplary embodiment of the disclosed imaging systems, at least two of the pictures respectively captured via at least two of the imaging devices constitute a three-dimensional picture of an object.

In an exemplary embodiment of the disclosed imaging systems, the plurality of imaging devices comprises:
a first imaging device arranged on the UAV for supporting operation of the UAV; and
a second imaging device arranged on the UAV for functional and/or navigational purposes.

In an exemplary embodiment of the disclosed imaging systems, the first imaging device comprises a first-person view ("FPV") imaging device for capturing first pictures in a first-person view.

In an exemplary embodiment of the disclosed imaging systems, the second imaging device comprises a functional imaging device.

In an exemplary embodiment of the disclosed imaging systems, the first imaging device is positioned at a front portion of the UAV.

In an exemplary embodiment of the disclosed imaging systems, the first imaging device is associated with a first gimbal configured to control an orientation of the first imaging device.

In an exemplary embodiment of the disclosed imaging systems, the first gimbal is a one-dimensional stabilized gimbal or a three-dimensional stabilized gimbal.

In an exemplary embodiment of the disclosed imaging systems, the first gimbal is enabled to rotate about at least a pitch axis of the UAV.

In an exemplary embodiment of the disclosed imaging systems, the first gimbal is configured to operate under at least one of a following mode, an FPV mode, a free mode and a gimbal return mode.

In an exemplary embodiment of the disclosed imaging systems, the first imaging device is configured to capture a plurality of first pictures in respective directions from the UAV.

In an exemplary embodiment of the disclosed imaging systems, the captured first pictures support determination of a travel path for the UAV.

In an exemplary embodiment of the disclosed imaging systems, the first imaging device supports navigation of the UAV.

In an exemplary embodiment of the disclosed imaging systems, the functional imaging device is positioned at a front portion, a front portion, a side portion or a lower portion of the UAV.

In an exemplary embodiment of the disclosed imaging systems, the functional imaging device is associated with a second gimbal for controlling an orientation of the functional imaging device.

In an exemplary embodiment of the disclosed imaging systems, the functional imaging device is configured to conduct at least one of capturing ambient images, monitoring surroundings of the UAV, and searching and rescuing.

In an exemplary embodiment of the disclosed imaging systems, the second gimbal is configured to rotate about up to three axes.

In an exemplary embodiment of the disclosed imaging systems, the gimbal comprises a stabilization capacity.

In an exemplary embodiment of the disclosed imaging systems, the second gimbal operates under at least one of an FPV mode, a following mode, a free mode and a gimbal return mode.

In an exemplary embodiment of the disclosed imaging systems, the second imaging device comprises a wide-angle lens for capturing a second picture in a larger view.

In an exemplary embodiment of the disclosed imaging systems, the first and second gimbals cooperate for working under an FPV-plus-free mode or an FPV-plus-following mode.

In an exemplary embodiment of the disclosed imaging systems, the second pictures are configured to assist in operating the UAV.

In an exemplary embodiment of the disclosed imaging systems, the second imaging device is configured to provide a view for purposes of navigation and/or functional imaging.

In an exemplary embodiment of the disclosed imaging systems, the second imaging device supports navigation of the UAV.

In an exemplary embodiment of the disclosed imaging systems, the first and second pictures are configured for a purpose selected from a group consisting of determining a position of the UAV, determining a travel direction, selecting an optimal travel path and avoiding obstacles.

In an exemplary embodiment of the disclosed imaging systems, the optimal travel path is determined based on functional requirements of the functional imaging device.

In an exemplary embodiment of the disclosed imaging systems, the optimal travel path is selected based on an operational requirement for a future task assigned to the UAV.

In accordance with another aspect disclosed herein, there is set forth a method for presenting pictures at a ground node, comprising:

receiving bitstreams for each of a plurality of channels at the ground node; and presenting one or more of the bitstreams for each of the channels at the ground node.

In an exemplary embodiment of the disclosed methods, receiving the bitstreams comprises receiving the bitstreams from one or more aerial nodes.

In another exemplary embodiment of the disclosed methods, decoding the bitstreams for each of the channels at the ground node.

In another exemplary embodiment of the disclosed methods, decoding the bitstreams comprises decoding the bitstreams in accordance with a MPEG-4 Part 10 or advanced video coding ("H.264") protocol.

Exemplary embodiments of the disclosed methods further comprise selecting one or more channels of the decoded bitstreams for presentation.

In another exemplary embodiment of the disclosed methods, selecting the channels comprises selecting the channels in accordance with a user selection.

In another exemplary embodiment of the disclosed methods, presenting the bitstream comprises presenting the selected decoded bitstreams.

In another exemplary embodiment of the disclosed methods, presenting the selected decoded bitstreams comprises displaying the selected decoded bitstreams in a picture-in-picture format, picture-by-picture format or a picture-on-picture format.

In another exemplary embodiment of the disclosed methods, presenting the selected decoded bitstreams comprises displaying the selected decoded bitstreams via an intelligent terminal.

In another exemplary embodiment of the disclosed methods, presenting the decoded bitstreams comprises enabling a selected picture to be presented in an adjustable manner.

In another exemplary embodiment of the disclosed methods, enabling the selected picture to be presented in the adjustable manner comprises enabling at least one of a location, a size and a quality of the pictures to be adjusted.

In another exemplary embodiment of the disclosed methods, presenting the bitstream comprises combining at least two pictures, each being part of a three-dimensional picture, in at least two separate channels into a respective three-dimensional picture.

In another exemplary embodiment of the disclosed methods, presenting the bitstreams comprises presenting the three-dimensional picture.

In another exemplary embodiment of the disclosed methods, receiving the bitstreams comprises receiving the bitstreams via a remote controller of an unmanned aerial vehicle ("UAV").

Exemplary embodiments of the disclosed methods further comprise controlling at least one action of the UAV with the remote controller.

In another exemplary embodiment of the disclosed methods, action of the UAV is one of pitch, roll, yaw, elevate, ascend, descend, accelerate and decelerate.

Exemplary embodiments of the disclosed methods further comprise controlling imaging actions of at least one imaging device used to capture the pictures.

In another exemplary embodiment of the disclosed methods, controlling the imaging actions comprises controlling at least one of controlling an orientation, zooming-in and zooming-out.

In accordance with another aspect disclosed herein, there is set forth a computer program product comprising instructions for presenting pictures in accordance with any one of previous embodiments of the disclosed methods.

In accordance with another aspect disclosed herein, there is set forth ground node for presenting pictures, comprising:

a wireless receiving module configured to receive bitstreams for each of a plurality of channels; and a picture presenting module for presenting the received bitstreams.

In an exemplary embodiment of the disclosed ground nodes, the wireless receiving module is configured to receive bitstreams from an aerial node.

Exemplary embodiments of the disclosed ground nodes further comprise a picture decoding module configured to decode the bitstreams for each of the channels.

In another exemplary embodiment of the disclosed ground nodes, the picture decoding module is configured to decode the bitstreams in accordance with a MPEG-4 Part 10 or an advanced video coding ("H.264") protocol.

In another exemplary embodiment of the disclosed ground nodes, the picture presenting module is configured to select one or more channels of the decoded bitstreams for presentation.

In another exemplary embodiment of the disclosed ground nodes, the picture presenting module is configured to select the channels in accordance with a user selection.

In another exemplary embodiment of the disclosed ground nodes, the picture presenting module is configured to present the selected decoded bitstreams.

In another exemplary embodiment of the disclosed ground nodes, the picture presenting module is configured to present the selected decoded bitstreams in a picture-in-picture, picture-by-picture or a picture-on-picture format.

In another exemplary embodiment of the disclosed ground nodes, the picture presenting module is configured to present the selected decoded bitstreams with an app of an intelligent terminal.

In another exemplary embodiment of the disclosed ground nodes, the picture presenting module is configured to enable any picture to be presented in an adjustable manner.

In another exemplary embodiment of the disclosed ground nodes, the adjustable manner comprises at least one of a location, a size and a quality of the pictures to be adjusted.

In another exemplary embodiment of the disclosed ground nodes, the picture presenting module is configured to combine at least two pictures in at least two separate channels, each picture being part of a three-dimensional picture, to a three-dimensional picture.

In another exemplary embodiment of the disclosed ground nodes, the picture presenting module is configured to present the three-dimensional picture on a display.

Exemplary embodiments of the disclosed ground nodes further comprise a remote controller of an unmanned aerial vehicle ("UAV").

In another exemplary embodiment of the disclosed ground nodes, the remote controller is configured to control at least one action of the UAV with the remote controller.

In another exemplary embodiment of the disclosed ground nodes, the action of the UAV is one of pitch, roll, yaw, elevate, ascend, descend, accelerate and decelerate.

In another exemplary embodiment of the disclosed ground nodes, the remote controller is configured to control imaging actions of at least one imaging device used to capture a channel of pictures.

In another exemplary embodiment of the disclosed ground nodes, the imaging actions comprise at least one of controlling an orientation, zooming-in and zooming-out.

Figure 1:
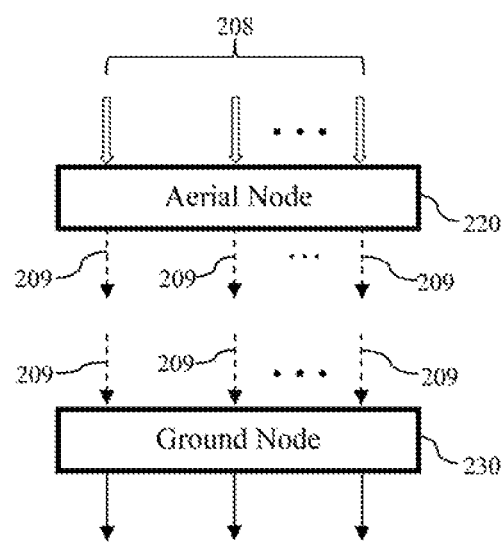
FIG. 1 is an exemplary top-level block diagram illustrating an embodiment of an imaging system, wherein an aerial node can acquire pictures from multiple channels and transfer the pictures to another node for presentation.

It should be noted that the figures are not drawn to scale and that elements of similar structures or functions are generally represented by like reference numerals for illustrative purposes throughout the figures. It also should be noted that the figures are only intended to facilitate the description of the embodiments. The figures do not illustrate every aspect of the described embodiments and do not limit the scope of the present disclosure.

DETAILED DESCRIPTION OF THE EMBODIMENTS

Since currently-available imaging systems associated with unmanned vehicles, especially unmanned aerial vehicles, have limited ability to capture, transfer and present pictures from multiple vision views, a system for capturing pictures by multiple imaging devices and transferring the pictures for presentation can prove desirable and provide a basis for imaging systems operating on the unmanned vehicles. This result can be achieved according to one embodiment of the imaging system 100 as illustrated in FIG. 1.

FIG. 1 illustrates an embodiment of an imaging system 100 for transferring pictures. Turning to FIG. 1, the imaging system 100 can comprise an aerial node 220 that can acquire (and/or collect) pictures via multiple channels 208 and transfer the pictures to another node for presentation. The other node can be located proximally to, and/or distally from, the aerial node 220, and, for example, can be a ground node 230 shown in FIG. 1. In some embodiments, at least two of the channels 208 can be utilized for connecting to devices that are capable of capturing pictures, e.g. imaging devices 210 (shown in FIG. 2). For purposes of this disclosure, the pictures can comprise single still images (or frames) and/or a series of images (or frames) such as motion pictures.

The aerial node 220 can be arranged on an aerial platform 101 (shown in FIG. 11), e.g., an Unmanned Aerial Platform ("UAV"). In some embodiments, the aerial node 220 can process the channels 208 separately in a parallel manner. In other embodiments, the aerial node 220 can process the channels 208 on a time-sharing basis. For purposes of illustration but not limitation, the aerial node 220 can transfer the pictures in each of the channels 208 as a bitstream 209.

The imaging system 100 can include an optional ground node 230 that can receive the pictures transferred from the aerial node 220. The received pictures can be in same forms of bitstreams 209 being transferred from the aerial node 220. The ground node 230 can comprise various functionalities for receiving, processing and/or presenting the received pictures. Additional detail regarding the ground node 230 will be provided with reference to FIGS. 3 and 5.

In some other embodiments, the ground node 230 can present two or more channels of pictures. For purposes of illustration, but not limitation, the ground node 230 can present the two or more channels of pictures in a selected format, such as a picture-in-picture format. Additional detail regarding the presentation of the pictures will be shown and described with reference to FIGS. 3, 5, 16-18.

Although shown and described as being included in the system 100 for purposes of illustration only, the aerial node 220 and the ground node 230 can work either individually or in combination.

Figure 2:
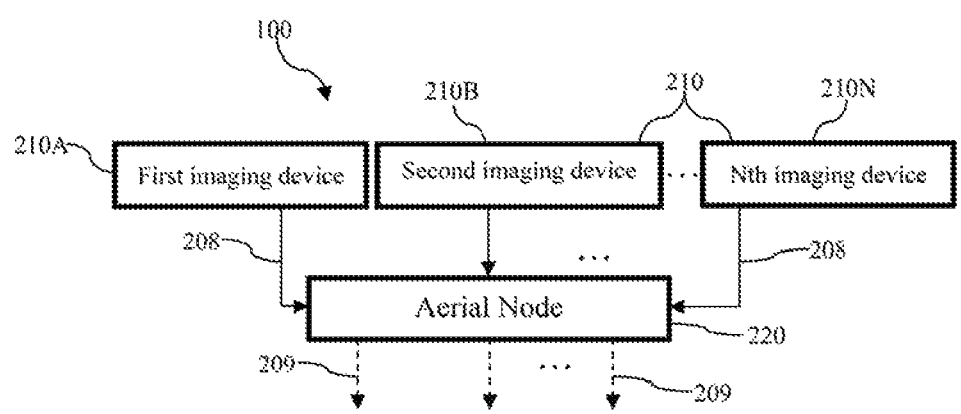
FIG. 2 is an exemplary top-level block diagram illustrating an alternative embodiment of the imaging system of FIG. 1, wherein the aerial node can connect with a plurality of imaging devices for acquiring pictures from the multiple channels.

FIG. 2 illustrates another embodiment of the exemplary imaging system 100. Turning to FIG. 2, the aerial node 220 can connect with a plurality of imaging devices 210, via a plurality of channels 208 respectively, for acquiring pictures. In FIG. 2, the aerial node 220 can connect with a preselected number N of imaging devices 210 through a predetermined number N channels. In some embodiments, the aerial node 220 can have at least N input channels available for connecting the imaging devices 210.

Although shown and described as being separate devices for purposes of illustration only, the imaging devices 210 can be at least partially integrated with the aerial node 220. The imaging devices 210A, 210B, . . . , 210N can be same and/or different types and/or models. As shown and described herein, the aerial node 220 can acquire the pictures from the imaging devices 210, process the pictures and transfer the pictures to another node as bitstreams 209 for each of the channels 208.

Figure 3:
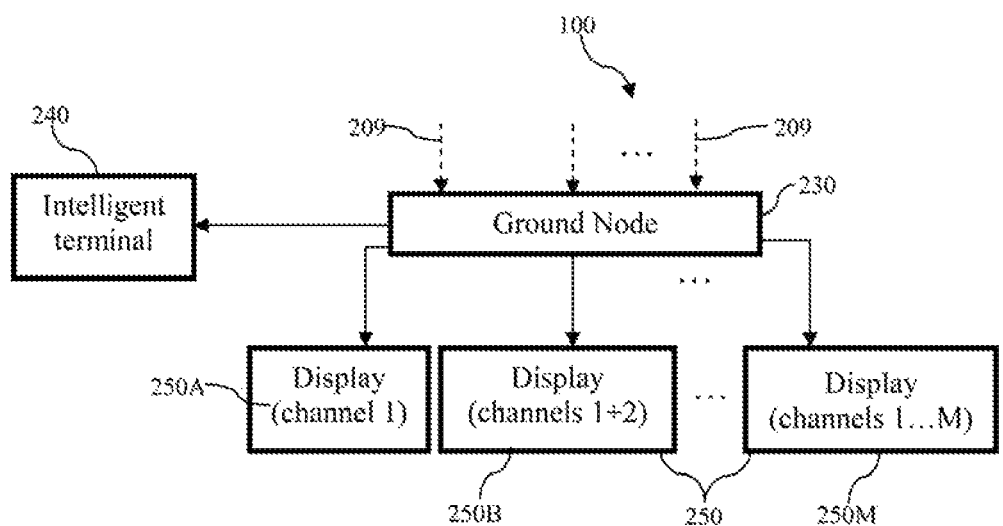
FIG. 3 is an exemplary top-level block diagram illustrating another alternative embodiment of the imaging system of FIG. 1, wherein the ground node can connect to multiple displays for presenting the pictures in each of the multiple channels.

FIG. 3 illustrates another embodiment of the exemplary imaging system 100. Turning to FIG. 3, the ground node 230 can connect to a predetermined number M of displays 250 for presenting the pictures in each of the plurality of channels 208 (shown in FIG. 1). The display 250A, 250B, . . . , 250M can be same and/or different types and/or models. As shown and described herein, the ground node 230 can receive the pictures from another node, e.g., the aerial node 220 (shown in FIG. 2), and can process and present the pictures in a selected format.

The ground node 230 can connect to a predetermined number M of displays 250 for presenting the pictures captured from the imaging devices 210. The predetermined number M of displays 250 connected with the ground node 230 can be same and/or different from the predetermined number N of imaging devices 210. In some embodiments, the number of displays 250 M can be less than the number of channels 208 N, so that, a selected subset of the channels 208 can be presented. The ground node 230 can present one channel of pictures on one display 250, present multiple channels of pictures on one display 250 and/or present one channel on two or more displays 250. As shown and described herein, the ground node 230 can select to present multiple channels 208 on one display 250 in a selected format, such as a picture-in-picture format.

Alternatively and/or additionally, the ground node 230 can connect to an intelligent terminal 240 and can present one or more selected channels of pictures via the intelligent terminal 240. For purposes illustration and not limitation, the intelligent terminal 240 can be a smartphone, an iPad, a notepad and the like. When two or more channels 208 are presented, the pictures can be presented in a selected format, such as a picture-in-picture format.

Figure 4:
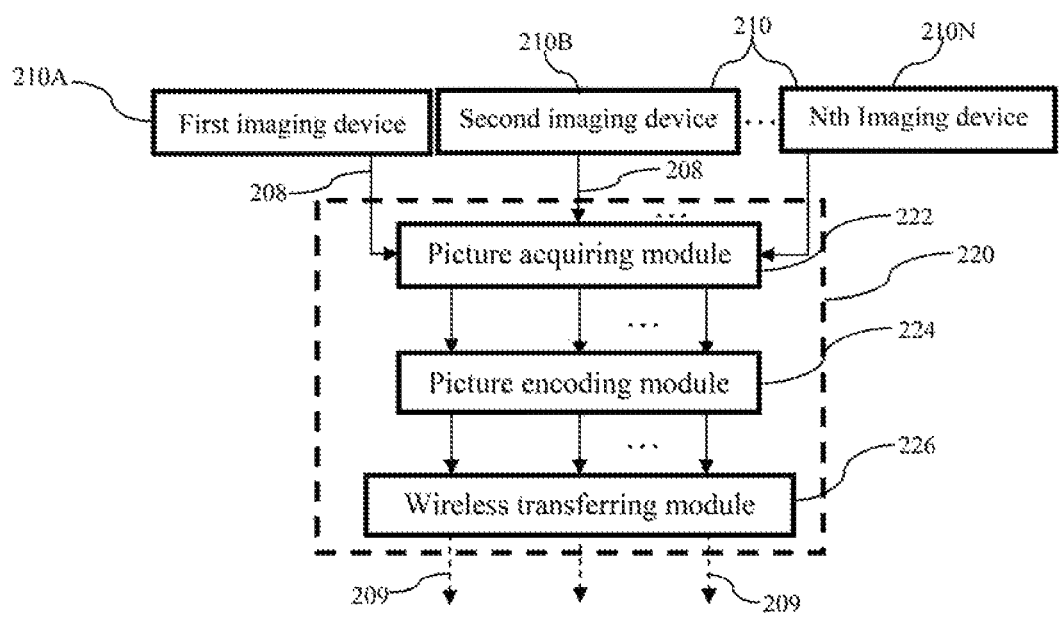
FIG. 4 is an exemplary detail block diagram illustrating an alternative embodiment of the imaging system of FIG. 2, wherein the aerial node can comprise three modules for acquiring, encoding and transferring the pictures acquired from the multiple channels.

FIG. 4 illustrates an alternative embodiment of the exemplary imaging system 100. Turning to FIG. 4, an aerial node 220 can comprise three modules 222, 224, 226 for respectively acquiring, encoding and transferring pictures acquired from the plurality of channels 208 (shown in FIG. 1). In FIG. 4, the aerial node 220 can comprise a picture acquiring module 222 for acquiring the pictures via a number of N channels being connected to N imaging devices 210. The imaging devices 210 can be arranged on a common aerial platform 101, e.g. an Unmanned Aerial Platform ("UAV") (shown in FIG. 11) and can be connected to the picture acquiring module 222 via wired and/or wireless connections. In some embodiments, some of the N imaging devices 210 can be arranged on other mobile platforms (not shown). In such embodiments, the imaging devices 210 are connected to the picture acquiring module 222 via wireless connections.

In some other embodiments, at least two of the pictures collected respectively via at least two of the channels 208 can constitute a three-dimensional picture of an object of interest. Each of the pictures can be captured by a selected imaging device 210. In other words, the selected imaging device 210 can be one of two or more imaging devices 210 that form a three-dimensional imaging system (not shown). Alternatively and/or additionally, the pictures captured in two or more of the channels 208 can constitute three-dimensional motion pictures.

The acquired pictures acquired via the respective channels 208 can be provided to a picture encoding module 224. The picture encoding module 224 can encode and/or compress the pictures to generate a bitstream 209 for each of the channels 208. The encoding and/or compressing can be conducted for each channel in a parallel or serial manner. The picture encoding module 224 can encode and/or compress the picture in accordance with any conventional encoding/compression protocol, such as a MPEG-4 Part 10, Advanced Video Coding ("H.264") or any protocols under High Efficiency Video Coding (HEVC) standard, including, but not limited to, MPEG-H Part 2 and ITU-T H.265. The picture encoding module 224 can transmit the encoded pictures in a form of bitstreams 209 to a wireless transferring module 226.

The wireless transferring module 226 can transfer the bitstreams 209 for each of the channels 208 to another node, e.g., a ground node 230 (shown in FIG. 1). The wireless transferring module 226 can transfer the bitstreams 209 in accordance with any suitable wireless transfer protocols, such as conventional public protocols, Real Time Messaging Protocol ("RTMP") protocol and a Real Time Streaming Protocol ("RTSP") protocol, or any suitable proprietary protocols.

Although shown and described as having a transferring functionality for purposes of illustration only, the wireless transferring module 226 can have other functionalities in related to the transfer, such as transformation, storage or modulation and the like. Although shown and described as being separate modules for purpose of illustration only, the picture acquiring module 222, the picture encoding module 224 and/or the wireless transferring module 226 can be at least partially integrated into one module.

Figure 5:
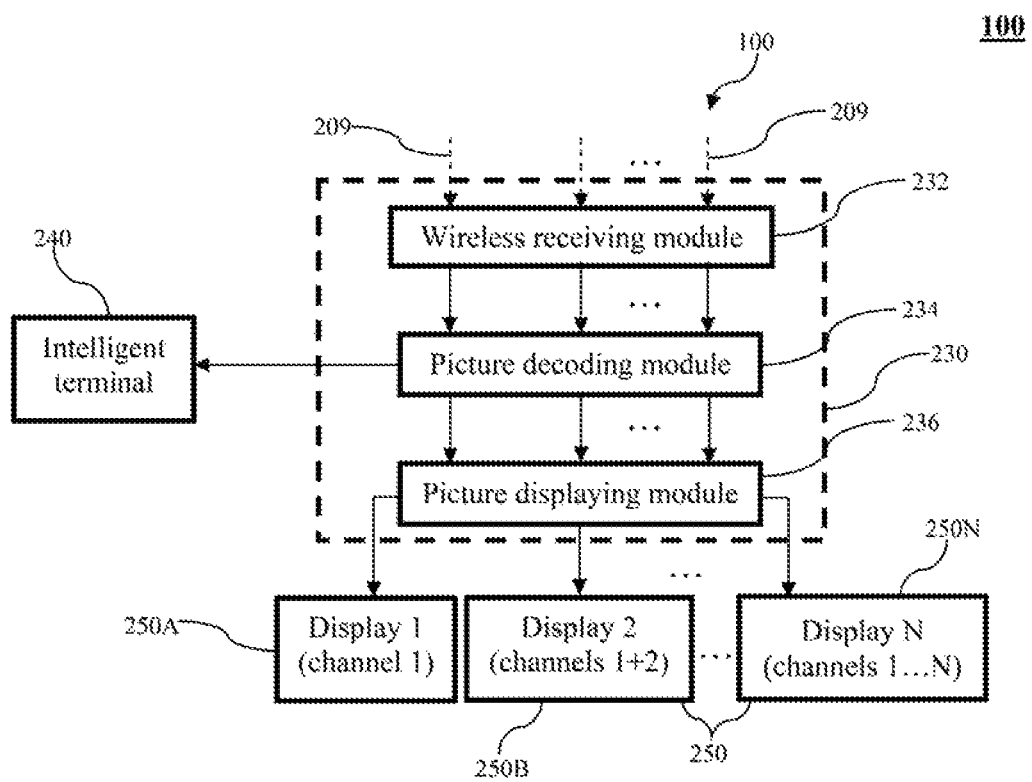
FIG. 5 is an exemplary detail block diagram illustrating an alternative embodiment of the imaging system of FIG. 3, wherein the ground node can comprise three modules for receiving, decoding and presenting the pictures acquired from the multiple channels.

FIG. 5 illustrates another alternative embodiment of the exemplary imaging system 100. Turning to FIG. 5, a ground node 230 can comprise three modules 232, 234, 236 for respectively receiving, decoding and presenting pictures in from the multiple channels 208 (shown in FIG. 1). In FIG. 5, at the ground node 230, the wireless receiving module 232 can receive the bitstreams 209 from another node, e.g., the aerial node 220 (shown in FIG. 1). In some embodiments, the wireless receiving module 232 can wait for the bitstreams 209 at each of the channels 208 to help ensure that the bitstreams 209 are received in real-time. The wireless receiving module 232 can transmit the bitstreams 209 for each of the channels 208 to the picture decoding module 234.

Although shown and described as having a receiving functionality for purposes of illustration only, the wireless receiving module 232 can have other functions in related to the reception, such as transformation, storage or modulation and the like.

The picture decoding module 234 can decode and/or decompress the bitstreams 209 to restore the captured pictures in each of the channels 208. The picture decoding module 234 can process the bitstreams 209 in a parallel and/or serial manner. In some embodiments, the picture decoding module 234 can have cache memories for at least one of the channels 208. The cache memories can serve as buffers for providing temporary storage of the bitstreams 209 in case a transfer speed from the wireless transferring module 226 to the wireless receiving module 232 cannot match a process speed of the picture decoding module 234. Because the buffer time can be relatively short, the pictures can be regarded as being processed in a real-time manner.

The picture decoding module 234 can transmit the restored pictures to a picture displaying module 236 for presentation via at least one of displays 250. In some embodiments, the picture decoding module 234 can have a user interface (not shown) for prompting and/or receiving user selections. Additional detail regarding the user selections will be provided below with reference to FIG. 14. The selected channels 208 can be presented with one or more of the displays 250. When two or more channels 208 are selected to be presented with one display 250, the pictures can be presented in a picture-in-picture format, a picture-by-picture format and/or a picture-on-picture format. Additional detail regarding the presentation will be provided below with reference to FIGS. 16-18.

Alternatively and/or additionally, the captured pictures can be provided to an intelligent terminal 240, including, but not limited to, a smartphone, an iPad, a notepad and the like. The intelligent terminal 240 can choose any one or more channels 208 for presentation. The intelligent terminal 240 can present the pictures for exemplary purposes of controlling the aerial platform 101 and/or for other functional purposes. With the intelligent terminal 240, the chosen channels 208 can be presented conveniently via any suitable applications of the intelligent terminal 240.

In some embodiments, as shown and described with reference to FIG. 4, at least two of the pictures encoded in at least two of the channels 208 can constitute a three-dimensional picture. In such embodiments, the picture displaying module 236 can transmit the two pictures via two inputs when the display 250 is a three-dimensional display. Alternatively and/or additionally, the picture displaying module 236 can be enabled to merge the two pictures into a three-dimensional picture, via any conventional three-dimension reconstruction process, for presentation with at least one of the displays 250.

Figure 6:
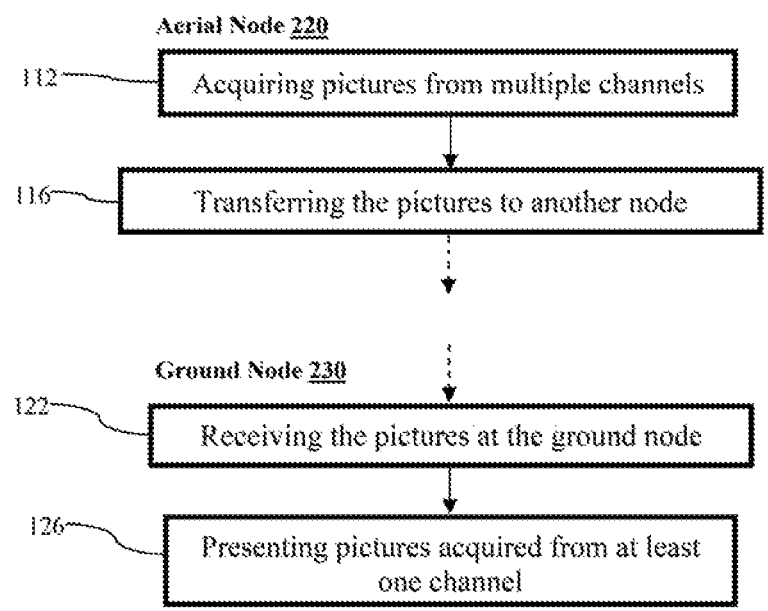
FIG. 6 is an exemplary top-level flowchart illustrating an embodiment of an imaging method for transferring pictures, wherein the pictures are acquired from multiple channels and at least one channel of pictures is presented.

To facilitate presenting pictures captured by the imaging devices 210, a method of acquiring pictures via multiple channels 208 and transferring the pictures to another node for presentation can be desirable. FIG. 6 illustrates an embodiment of an exemplary imaging method 200, wherein the pictures are acquired from the multiple channels 208 and at least one channel of pictures can be presented at another node, e.g., the ground node 230.

In FIG. 6, the pictures can be acquired via the multiple channels 208, at 112, at the aerial node 220. Each of the imaging devices 210 (shown in FIG. 2) can be connected to one of the multiple channels 208. In some embodiments, at least two of the channels 208 can be connected to at least two imaging devices 210, respectively. The captured pictures via each of the multiple channels 208 can be acquired at the aerial node 220, at 112, for subsequent processing and transferring the pictures.

In some embodiments, at least two of the pictures acquired respectively via at least two of the channels 208 can constitute a three-dimensional picture of an object of interest. Each of the pictures can be captured by the imaging device 210 that is one of two imaging devices 210 in a three-dimensional imaging system (not shown). Alternatively and/or additionally, the pictures captured in two of the channels 208 can constitute three-dimensional motion pictures.

At 116, the pictures acquired via each of the channels 208 can be transferred to another node, e.g., a ground node 230 as shown in FIG. 6. In some embodiments, the pictures can be processed at the aerial node 220 before being transferred. Additional detail regarding the acquiring and transferring the pictures will be provided below with reference to FIG. 7.

In some other embodiments, the pictures can be received and presented at the ground node 230. At 122, two or more channels of pictures can be received at the ground node 230. At least one of the channels 208 can be selected for presentation based upon one or more certain parameters, such as a user selection, preset priorities and the like. The selected channels of pictures can be presented, at 126, for purposes of satisfying various needs of the user. In some embodiments, the selected channels 208 can be presented with multiple displays 250 (shown in FIG. 5), each presenting one or more channels 208. In some other embodiments, the selected pictures can be presented with a single display 250 in predetermined a format, including, but not limited to, a picture-in-picture format, a picture-by-picture format, a picture-over-picture format and the like. Additional detail regarding the selection and presentation of the pictures is set forth herein.

In some embodiments, as described herein, at least two of the pictures in at least two of the channels 208 can constitute a three-dimensional picture. In such embodiments, the two pictures can be transmitted to a display 250 via two inputs when the display 250 is a three-dimensional display. Alternatively and/or additionally, the two pictures can be merged into a three-dimensional picture, via any conventional three-dimension reconstruction process, for presentation with one of the displays 250.

Although shown and described as using displays 250 for presenting the pictures for purposes of illustration only, the pictures can be presented using any other suitable means, e.g. an application running on an intelligent terminal 240 (shown in FIG. 5), including, but not limited to, a laptop computer, a desktop computer, a computer server, a smartphone, an iPad, a notepad and the like. Although shown and described as working cooperatively in the method 200 for purposes of illustrative only, the aerial node 220 and the ground node 230 can work either individually or in combination, as shown and described herein.

Figure 7:
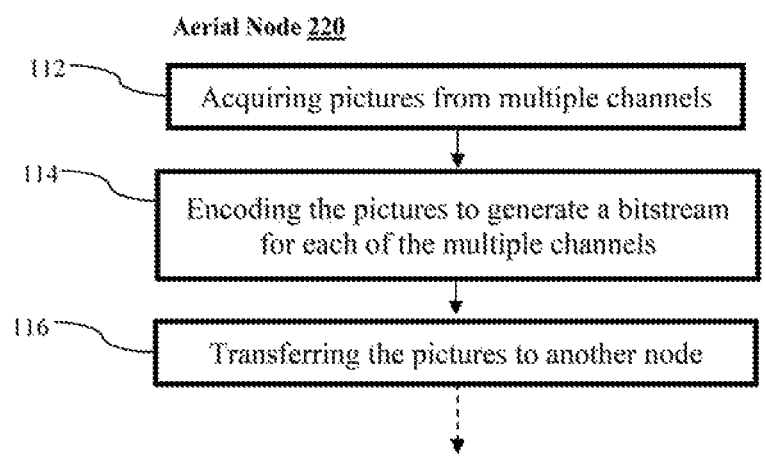
FIG. 7 is an exemplary flowchart illustrating an alternative embodiment of the imaging method of FIG. 6, wherein the pictures can be encoded, at an aerial node, for efficient and secure transfer via the multiple channels.

FIG. 7 illustrates an alternative embodiment of the imaging method 200. Turning to FIG. 7, the pictures can be acquired and encoded, at an aerial node 220, for purposes of transferring the pictures efficiently and securely via multiple channels 208 (shown in FIG. 1). In FIG. 7, the aerial node 220 can acquire pictures from the multiple channels 208, at 112, as shown and described in more detail above with reference to FIG. 6.

When the pictures are acquired by the aerial node 220, the pictures from the multiple channels 208 can be encoded, at 114. The pictures can be encoded in separate channels 208, at 114, to generate a plurality of encoded bitstreams 209 (shown in FIG. 1), each corresponding to a respective channel 208. The pictures of each of the channels 208 can be encoded in accordance with a protocol, such as a MPEG-4 Part 10, Advanced Video Coding ("H.264") or any protocols under a High Efficiency Video Coding (HEVC) standard, including but not limited to, MPEG-H Part 2 and ITU-T H.265. Because the pictures can be streamlined while being captured, each bitstream 209 can be transferred in a real-time manner.

At, 116, the encoded bitstreams 209 for each of the channels 208 can be transmitted to another node, e.g., a ground node 230. The bitstreams 209 can be transferred via a wired and/or a wireless connection between the aerial node 220 and the other node, e.g., the ground node 230. The bitstreams 209 can be transferred in accordance to either a public protocol, such as a Real Time Messaging Protocol ("RTMP") protocol or a Real Time Streaming Protocol ("RTSP") protocol, or any suitable proprietary transfer protocols.

Figure 8:
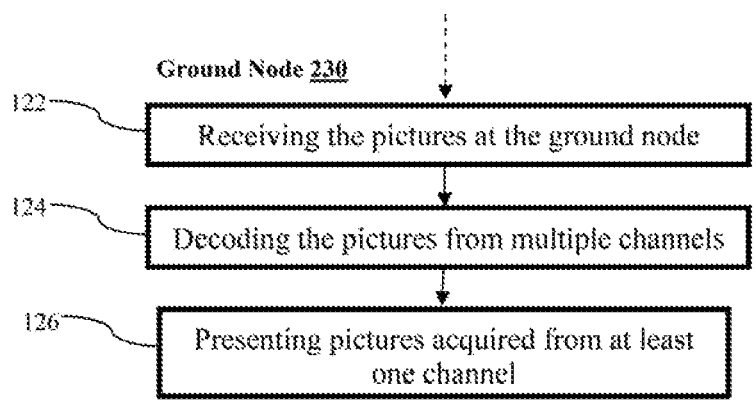
FIG. 8 is an exemplary flowchart illustrating another alternative embodiment of the imaging method of FIG. 6, wherein the pictures of the multiple channels can be decoded, at a ground node, for presentation.

FIG. 8 illustrates an alternative embodiment of the imaging method 200. Turning to FIG. 8, pictures of the multiple channels 208 (shown in FIG. 1) can be decoded, for presenting at a ground node 230. In FIG. 8, the pictures can be received, at 122, via a wired and/or wireless connection at the ground node 230 in a form of a plurality of bitstreams 209 (shown in FIG. 1). Each of the plurality of bitstreams 209 can represent the pictures of a respective channel 208 and can be transmitted from one or more other nodes, e.g., an aerial node 220. The received bitstreams 209 can be decoded, at 124. The received bitstreams 209 can be decoded in any conventional manner. The received bitstreams 209 can be decoded, for example, while being received and/or can be buffered for a specific short time before being decoded. The decoded bitstreams 209 can restore pictures in respective channels 208 and be ready for being presented, at 126. In some embodiments, the decoding of the pictures, at 124, is performed in accordance with a same protocol used for encoding the pictures. The decoded pictures can be selectively presented, at 126, in the manner shown and described in more detail above with reference to FIG. 6.

Although shown and described as encoding and decoding the pictures in separated channels 208 for purposes of illustration only, the bitstreams 209 can have certain degree of mixture in processes of encoding, decoding and/or transferring the pictures.

The pictures in multiple channels can be acquired, encoded, transferred, received, decoded and/or presented while the pictures are being captured by the imaging devices 210 with little delay or no delay (less the processing and transferring time). Therefore, the pictures can be presented in a real-time manner or in a time-delayed manner, in some embodiments with a negligible delay. The presented pictures can be used for purposes of, such as, navigating the aerial platform 101 and/or directing the imaging process etc.

Figure 9:
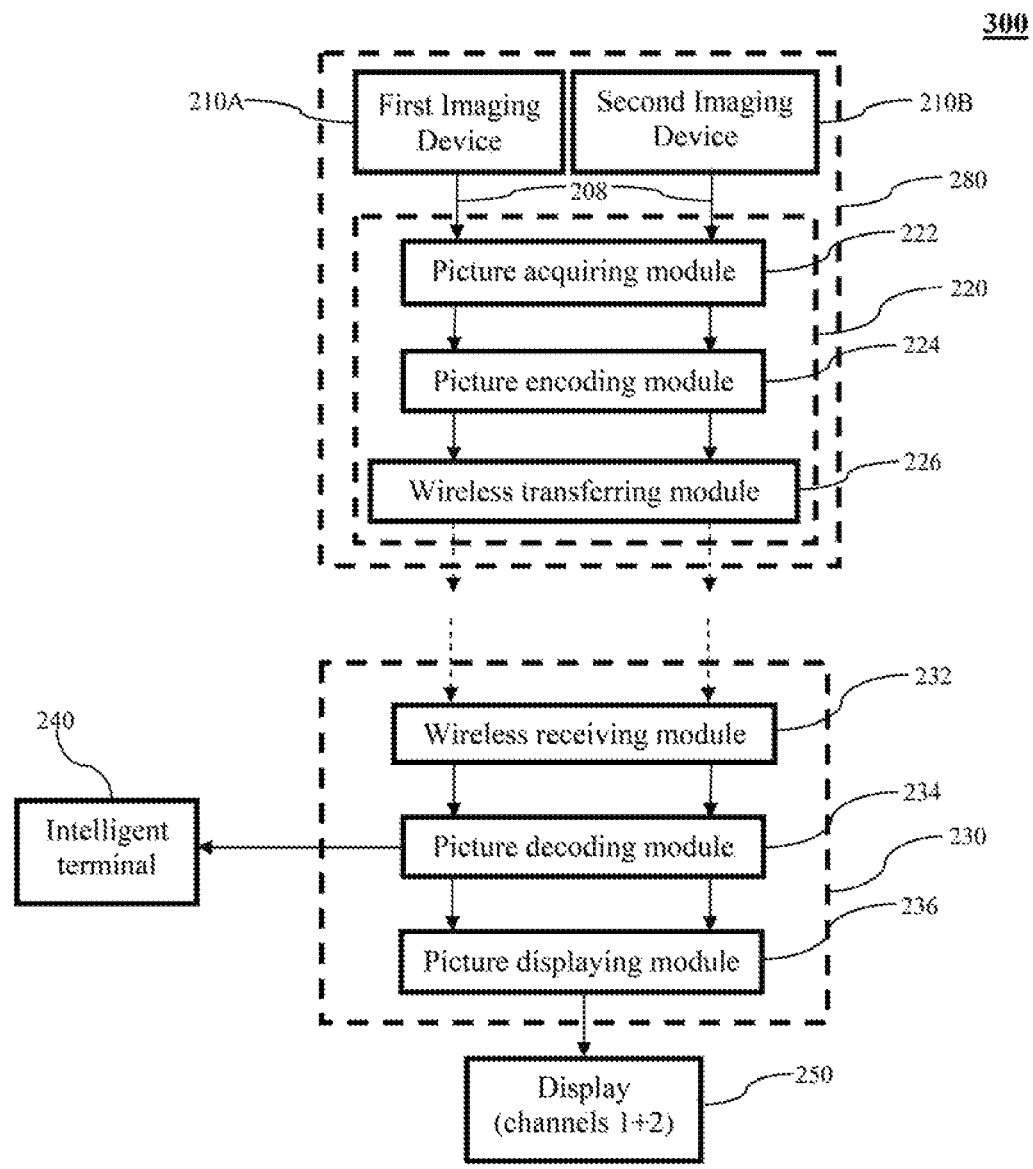
FIG. 9 is an exemplary block diagram illustrating another alternative embodiment of the imaging system of FIG. 1, wherein the aerial node can acquire pictures from two imaging devices, and wherein the ground node can present the pictures via a display.

FIG. 9 illustrates another embodiment of an exemplary imaging system 300. Turning to FIG. 9, the system 300 can include an aerial node 220 for acquiring pictures from two imaging devices 210A, 210B and a ground node 230 for presenting the pictures with a display 250. As shown and described herein, the imaging system 300 can implement the method 200 for acquiring, encoding, and transferring the captured pictures.

As illustrated in FIG. 9, the aerial node 220 of the imaging system 300 can comprise a picture acquiring module 222, a picture encoding module 224 and a wireless transferring module 226. The picture acquiring module 222 of the aerial node 220 can be connected with a first imaging device 210A and a second imaging device 210B via respective channels 208. The first imaging device 210A and the second imaging device 210B can have various purposes, e.g., the first imaging device 210A can be a first-person view ("FPV") imaging device, and the second imaging device 210B can be a functional imaging device. As shown and described below with reference to FIGS. 10 and 11, the first imaging device 210A can capture pictures for purposes of navigating and controlling an aerial platform 101. The second imaging device 210B can capture pictures for purposes of functional usage or for assisting the navigation and control of the aerial platform 101.

The picture acquiring module 222 can acquire the captured pictures from the first imaging device 210A and the second imaging device 210B via the channels 208. While acquiring the pictures, the picture acquiring module 222 can transmit the captured pictures to the picture encoding module 224. The picture encoding module 224 can encode and/or compress the pictures to generate a first bitstream for the pictures captured by the first imaging device 210A and/or a second bitstream for the pictures captured by the second imaging device 210B. The first bitstream and/or the second bitstream can be transmitted to the wireless transferring module 226. The wireless transferring module 226 can transfer the first bitstream and the second bitstream to another node, e.g. a ground node 230, for presenting the pictures.

In some embodiments, the imaging system 300 can comprise the ground node 230 for presenting the pictures. As shown and described herein, the ground node 230 can have a wireless receiving module 232, a picture decoding module 234 and a picture displaying module 236. The wireless receiving module 232 can receive the first bitstream and the second bitstream from another node, e.g., the aerial node 220 as shown in FIG. 9. The wireless receiving module 232 can transmit the first bitstream and/or the second bitstream to the picture decoding module 234. The picture decoding module 234 can decode and/or decompress the first bitstream and the second bitstream to restore the pictures in the two channels 208. The restored pictures reflect respective views captured by the first imaging device 210A and the second imaging device 210B. The picture decoding module 234 can transmit the restored pictures to the picture displaying module 236 for presenting the pictures.

The picture displaying module 236 can present the pictures via a display 250. In some embodiments, the display 250 can be enabled to present one or two channels of the pictures. The pictures captured by the first imaging device 210A can be regarded as a first channel of pictures, and the pictures captured by the second imaging device 210B can be regarded as a second channel of pictures. In some embodiments, the picture displaying module 236 can choose to present any of the two channels 208 or both channels 208 via the display 250. When both channels 208 are presented, the display 250 can present the pictures in a format of picture-in-picture, picture-by-picture or a picture-on-picture. Additional detail regarding the presentation of the pictures will be provided below with reference to FIGS. 16-18.

Because the pictures captured by both of the imaging devices 210A, 210B can be presented on one display 250, an operator of the aerial platform 101 can conveniently refer to the only display 250 for both views. Although shown and described as having one display 250 for purposes of illustration only, two or more displays 250 can be employed for presenting the pictures of the two channels 208.

Figure 10:
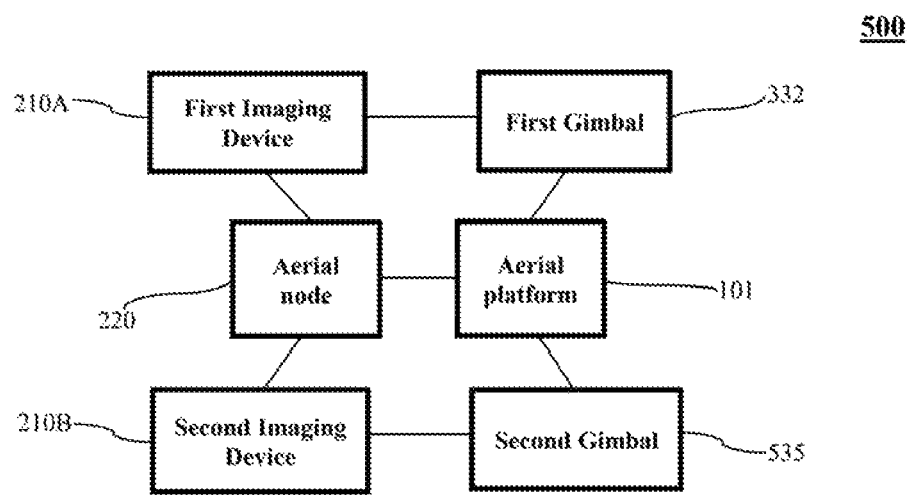
FIG. 10 is an exemplary block diagram illustrating an embodiment of an imaging system, wherein first and second imaging devices are installed on an aerial platform that is coupled with an aerial node.

FIG. 10 illustrates an embodiment of an aerial imaging system 500. Turning to FIG. 10, an aerial platform 101 is shown as having an aerial node 220 for transferring pictures and being coupled with first and second imaging devices 210A, 210B via first and second gimbals 332, 535. In FIG. 10, the first imaging device 210A can be configured to capture first pictures for purposes of operating the aerial platform 101; the second imaging device 210B can be configured to capture second pictures for purposes of functional imaging and/or assisting the operation of the aerial platform 101. The aerial node 220 can be connected with the first and second imaging devices 210A, 210B and configured to acquire the pictures captured by the first and second imaging devices 210A and 210B in a manner shown and described herein.

In some embodiments, the first imaging device 210A and the first gimbal 332 can be operated by an operator (or a pilot) of the aerial platform 101, and the second imaging device 210B and the second gimbal 535 can be operated by an imaging operator. The operator of the aerial platform 101 and the imaging operator can be the same person or different people. Additional detail regarding the first and second imaging devices 210A, 210B and first and second gimbals 332, 535 will be shown and described with reference to FIGS. 12-13.

With the first and second imaging devices 210A, 210B, the interference between the two operators can be avoided because each of the operator can control a respective imaging device. Alternatively and/or additionally, the pictures captured by the first and second imaging devices 210A, 210B can be transferred to another node, e.g., a ground node 230 (shown in FIG. 9), that can show the first pictures and/or the second pictures in a separated or a combine format. The operator of the aerial platform 101 can control the aerial platform 101 based on the first pictures and/or the second pictures.

Although shown and described as being individual devices for purposes of illustration only, the first and second imaging devices 210A, 210B can be integrated with the first and second gimbals 332, 535 to form first and second imaging assemblies 320, 330 (shown in FIGS. 12, 13) respectively. Additionally and/or optionally, additional imaging devices 210 can be employed for the purposes described herein.

Figure 11:
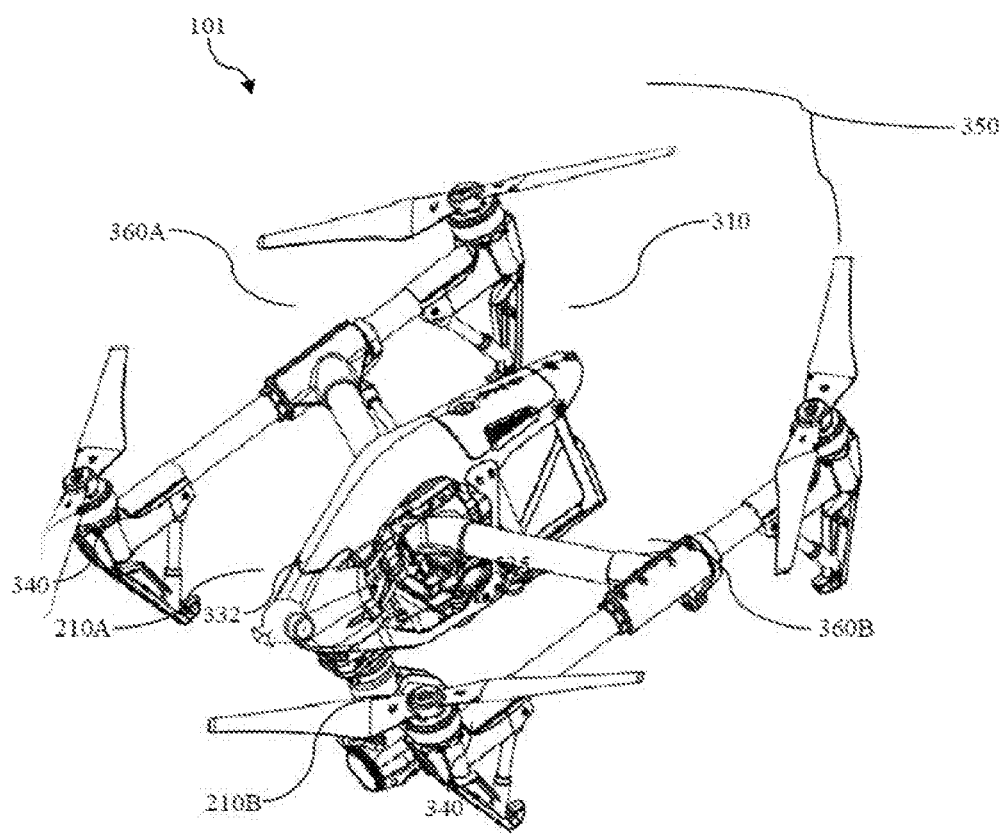
FIG. 11 is an exemplary schematic diagram illustrating an embodiment of the imaging system of FIG. 10, wherein first and second imaging devices are installed on an aerial platform via first and second gimbals, respectively.

FIG. 11 illustrates an alternative embodiment of the aerial imaging system 500. Turning to FIG. 11, first and second imaging devices 210A, 210B are shown as being installed on an aerial platform 101 via first and second gimbals 332, 535 respectively. In FIG. 11, the aerial platform 101 can be an UAV. The aerial platform 101 can have a fuselage (or body) 310 for housing an aerial node 220, an engine (not shown) and other relevant devices and/or mechanisms. The first and second imaging devices 210A, 210B can be attached via the first and second gimbals 332, 535 to any suitable region of the body 310 of the aerial platform 101. The first imaging device 210A, for example, can be attached to a front portion of the body 310, as shown in FIG. 11. The first imaging device 210A can be configured to capture pictures for purposes of operating the aerial platform 101. Additional detail regarding the first imaging device 210A and the first gimbal 332 will be set forth below with reference to FIG. 12.

Although shown and described as being attached to the front portion of the body 310 for purposes of illustration only, the first imaging device 210A can be attached to any suitable position of the aerial platform 101. Although shown and described as being a UAV for purposes of illustration only, the aerial platform 101 can be any other form of aerial vehicle, such as, a fixed wing airplane.

In FIG. 11, the second imaging device 210B can be attached via the second gimbal 535 to any suitable region of a lower portion of the body 310. The second imaging device 210B can be used to capture pictures for purposes of functional usage and/or assisting the operation of the aerial platform 101. Additional detail regarding the second imaging device 210B and the second gimbal 535 will be set forth below with reference to FIG. 13.

Although shown and described as being attached to the lower portion of the body 310 for purposes of illustration only, the second imaging device 210B can be attached to any suitable portion, including a front portion, a back portion, an upper portion and/or a side, of the aerial platform 101.

The aerial platform 101 can have certain frameworks 360A, 360B for supporting motors (not shown) and/or propellers 350 that can provide lifting power to the aerial platform 101. The aerial platform 101 can also have legs 340 to protect the first and second imaging assemblies 320, 330 and the aerial platform 101. Although shown and described as having a structure consisting of the body 310, the frames 360A, 360B, the propellers 350 and the legs 340 for purposes of illustration only, other components can be included in the structure for purposes described or not described herein, e.g. a housing for enclosing the body 310, a less or a greater number of engines, propellers and/or legs.

Figure 12:
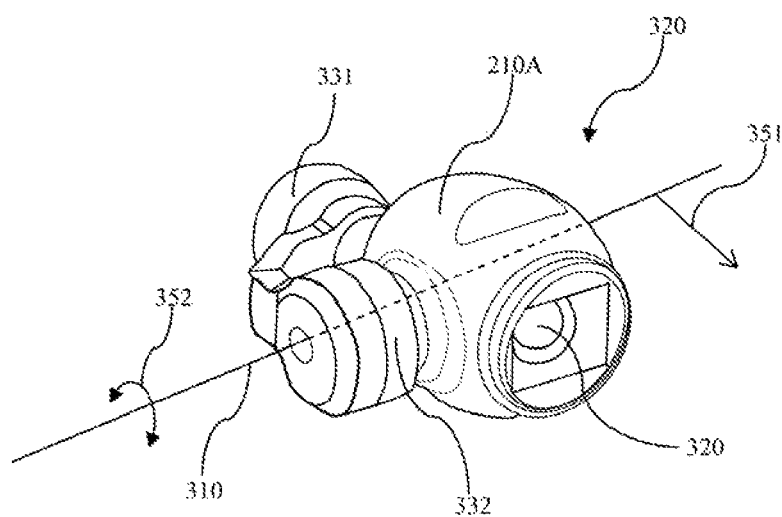
FIG. 12 is an exemplary schematic diagram illustrating an embodiment of the first imaging device of FIG. 11, wherein the first imaging device and the first gimbal are integrated to form a first imaging assembly.

FIG. 12 illustrates an alternative embodiment of a first imaging assembly 320 of the aerial imaging system 500. Turning to FIG. 12, the first imaging assembly 320 can be formed by integrating a first imaging device 210A and a first gimbal 332. In FIG. 12, the first imaging device 210A can be, e.g., an FPV imaging device. The first gimbal 332 can be coupled with the first imaging device 210A in any conventional manner and/or be integrated with the first imaging device 210A. The first imaging device 210A can be a still camera and/or a video camera, including, but not limited to, a natural light camera, a laser camera, an infrared camera, an ultrasound camera and the like.

The first gimbal 332 can be a one-dimensional gimbal, a two-dimensional gimbal, or a three-dimensional gimbal. The first gimbal 332 can advantageously be used to control an orientation of the first imaging device 210A. The one-dimensional gimbal can give an operator of the vehicle an easy operation solution about one pixel, while the providing the operator a good view, e.g., in a direction that is the same as an aerial platform 101 that the first imaging device 210A is attached. The two-dimensional gimbal and/or the three-dimensional gimbal can give the operator more flexibility for controlling the first imaging device 210A with additional complexity of operation. Therefore, the two-dimensional gimbal and/or the three-dimensional gimbal can be used in a more complicated operation environment and/or by a skilled operator.

Although shown in FIG. 12 as being a three dimensional gimbal for purposes of illustration only, the first gimbal 332 can be a one-dimensional gimbal. When the first gimbal 332 is a one-dimensional gimbal, the first gimbal 332 can be a one-dimensional stabilized gimbal that can rotate about a first axis 311, being stabilized about the axis 311. The first axis 311 can be a pitch axis of the aerial platform 101. When the first gimbal 332 rotates about the first axis 311 in either direction 352, the first imaging device 210A can make controllable pitch movements, either up or down. However, along the other axes, the lens can stay in a direction 352 in accordance with the aerial platform 101. Stated somewhat differently, other than the rotation about the first axis 311, a movement of the lens 320 can be controlled by a movement of the aerial platform 101.

Alternatively or optionally, the two dimensional gimbal can rotate about two axes and can have stabilization capacity about each of the two axes; and the three dimensional gimbal can rotate about three axes and can have stabilization capacity about each of the three axes. The first gimbal 332 can be attached to the body 310 of the aerial platform 101 via a first base 331. The first base 331 can be attached to the body 310 so that the lens 320 points horizontally in the direction 351 in accordance with the aerial platform 101.

Although shown and described as using the first base 331 for attaching the first gimbal 332 for purposes of illustration only, other suitable mechanisms can be employed for attaching the first gimbal 332 to the body 310, e.g. a mounting bracket.

The first imaging device 210A can be used to capture first pictures for purposes of navigation of the aerial platform 101, including, but not limited to, selecting an optimal travel path, avoiding obstacles, etc. An orientation of the first imaging device 210A can be controlled by the first gimbal 332. The first gimbal 332 can be controlled remotely, via a wireless connection, by a vehicle operator, e.g. a pilot of the aerial platform 101. The vehicle operator can operate the aerial platform 101 based on the information provided by the first pictures and/or other pictures, e.g. second pictures as shown and described herein.

Although described as using the wireless connection for purposes of illustration only, other suitable connections can be employed to connect the remote controller and the first gimbal 332, e.g. via an Internet connection or via a cellular network etc.

Figure 13:
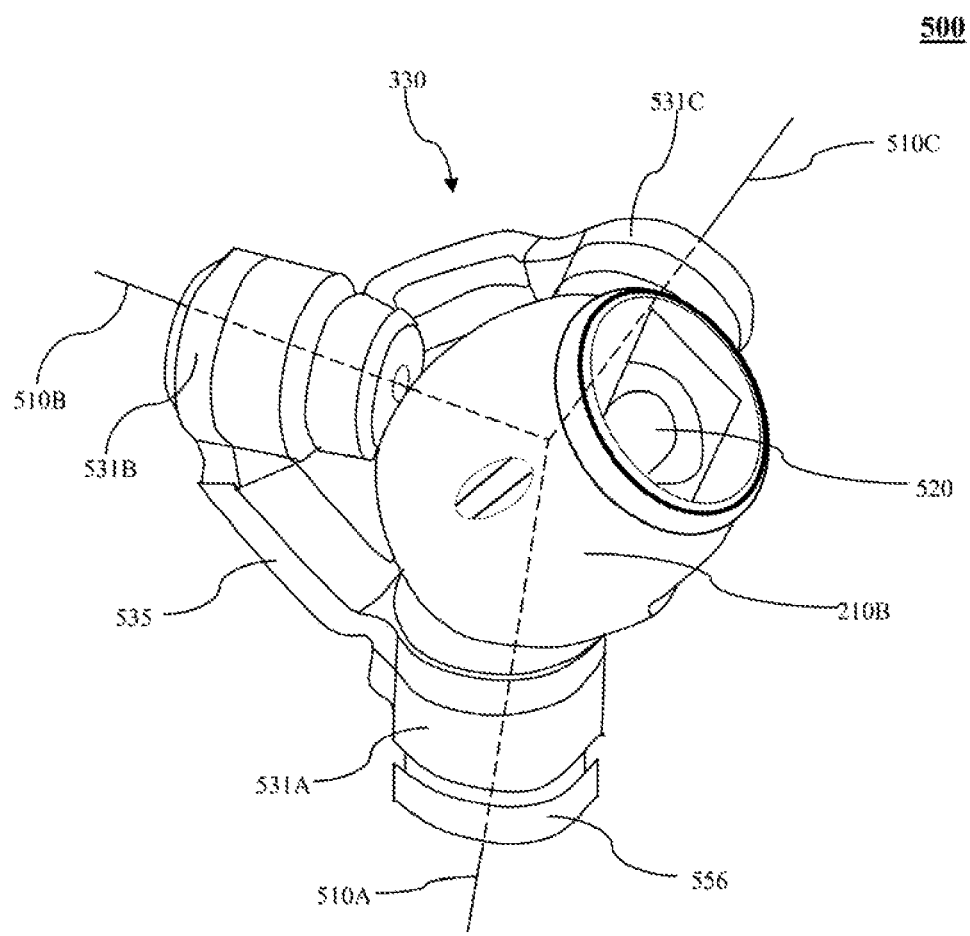
FIG. 13 is an exemplary schematic diagram illustrating an embodiment of the second imaging device of FIG. 11, wherein the second imaging device and the second gimbal are integrated to form a second imaging assembly.

FIG. 13 illustrates an embodiment of an exemplary second imaging assembly 330 of the imaging system 500. Turning to FIG. 13, a second imaging assembly 330 can be formed by integrating comprise a second imaging device 210B and a second gimbal 535. In FIG. 13, the second imaging device 210B can be a functional imaging device. The second imaging device 210B can be a still camera or a video camera, including, but not limited to, a natural light camera, a laser camera, an infrared camera, an ultrasound camera and the like.

The second gimbal 535 can be a three dimensional gimbal being able to rotate about three axes 510A, 510B, 510C. The three axes 510A, 510B, 510C can be a yaw axis 510A, a roll axis 510B and a pitch axis 510C. The second gimbal 535 can have stabilization capacities along the three axes 510A, 510B, 510C. When the second gimbal 535 rotates about the yaw axis 510A, a lens 520 of the second imaging device 210B can make a controllable yaw movement, either to a left or a right. When the second gimbal 535 rotates about the roll axis 510B, the lens 520 can make a controllable roll movement, either in a clockwise direction or in a counterclockwise direction. When the second gimbal 535 rotates about the pitch axis 510C, the lens 520 can make a controllable pitch movement, either up or down.

The second gimbal 535 can be attached to the body 110 via a second base 556. The second base 556 can be attached to the body 310 of the aerial platform 101 in a manner such that the lens can make movements in the three directions freely. Although shown and described as using a three-dimensional gimbal, the second gimbal 535 can be any suitable gimbal that can let the lens 520 change directions in a controllable manner, e.g. a one-dimensional gimbal or a two-dimensional gimbal.

The second imaging device 210B can be configured to capture second pictures for purposes of functional usage, including but not limited to, capturing ambient images, monitoring/inspecting surroundings of the aerial platform 101, and searching and rescuing. The second pictures can also be used to facilitate a navigation of the aerial platform 101. An orientation of the second imaging device 210B can be controlled by the second gimbal 535. The second gimbal 535 can be controlled remotely, via a wireless connection, by an imaging operator, e.g. a director of a movie or a photographer taking pictures, via a controller (not shown). The imaging operator can have an ability to view at least the second pictures while taking the second pictures.

Although described as using the wireless connection for purposes of illustration only, other suitable connections can be employed to connect the remote controller and the second gimbal 535, e.g. via an Internet connection or via a cell network etc.

Figure 14:
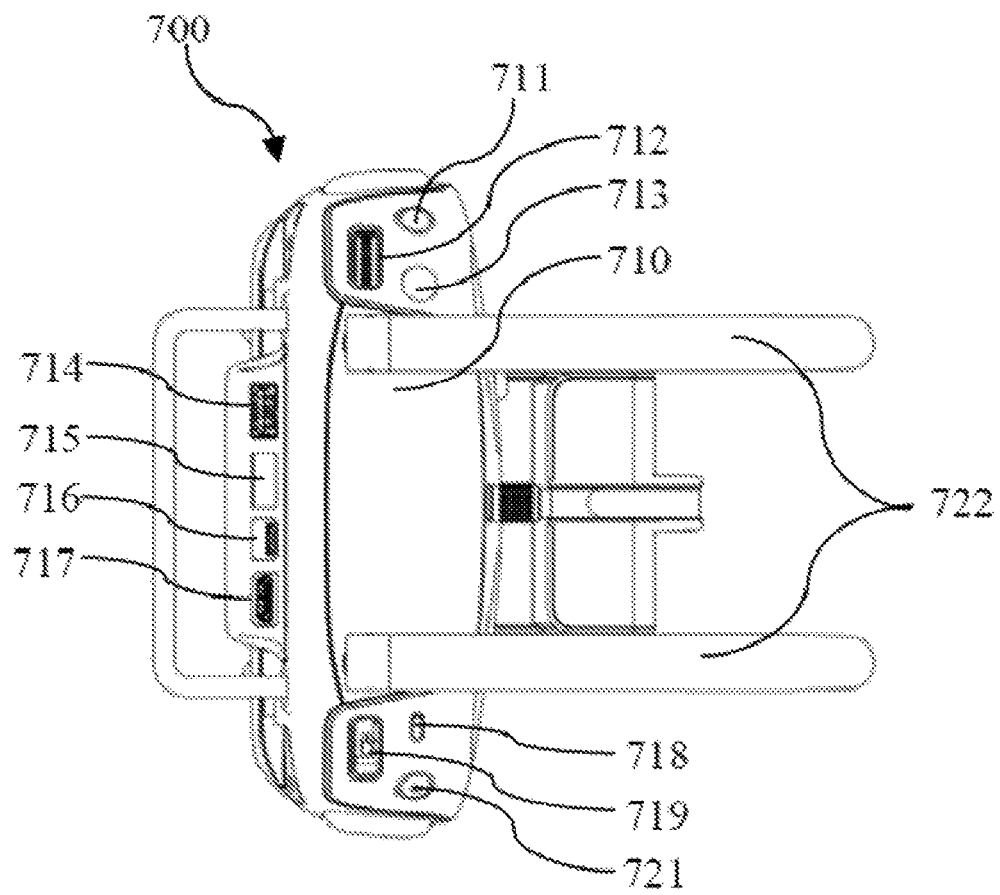
FIGS. 14 and 15 are exemplary schematic diagrams illustrating an embodiment of the ground node of the imaging system of FIG. 1.

FIG. 14 illustrates an embodiment of a ground node 230 of the imaging system 100. Turning to FIG. 14, the ground node 230 is a remote controller 700 of the aerial platform 101 of FIG. 11. In FIG. 14, the remote controller 700 can comprise a body 710 that can host a wireless receiving module 232, a picture decoding module 234 and a picture displaying module 236 (collectively shown in FIGS. 3 and 5). The remote controller 700 can have at least one antenna 722 for receiving data from the aerial platform 101, including, but not limited to, pictures in a form of bitstreams 209 (shown in FIG. 1).

Although shown and described as being a remote controller 700 for purposes of illustration only, the ground node 230 can be other suitable types of devices, e.g. a device dedicated to the functionalities described herein or any other device that can integrate the ground node 230 functionalities described herein.

Figure 15:
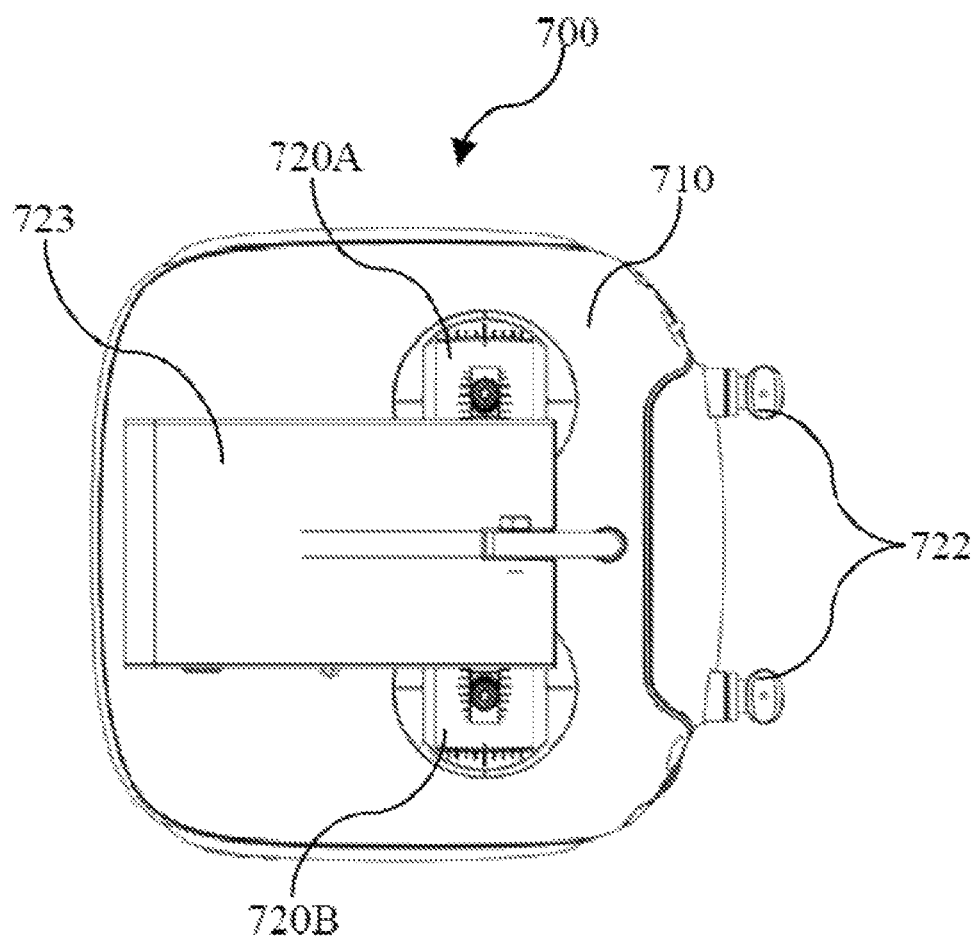

The remote controller 700 can have control functions for operating the aerial platform 101 and/or the first imaging device 210A (collectively shown in FIG. 11). For example, in FIG. 14, the remote controller 700 can comprise a turn knob 719 for controlling a first gimbal 332 (shown in FIG. 11) coupling with the first imaging device 210A, and buttons 711, 713, 718, 721 and 722 for operating the first imaging device 210A. In FIG. 15, showing another view of the ground node 230, the remote controller 700 can comprise two joysticks 720A, 720B for controlling movements of the aerial platform 101.

In FIG. 14, the remote controller 700 can have a body 710 that can contain the picture acquiring module 222, the picture decoding module 234 and the picture displaying module 236. In some embodiments, the remote controller 700 can have one or more interface ports for connecting to external devices, including, but not limited to, displays 250 (shown in FIG. 3).

Exemplary interface ports can include a USB port 714, a mini USB port 716, an HDMI port 717 and a spare port 715 that can be configured into another USB port.

The USB port 714 can be used to connect to a display 250 or an intelligent terminal 240 (shown in FIG. 3), such as an iPad, a smartphone, a notepad and the like. The HDMI port 717 can be used to connect to a display 250 with high definition. As shown and described herein, an operator can watch pictures presented on the display 250 that can present multiple channels 208.

Although shown and described as having one USB port 714 and one HDMI port 717 for purposes of illustration only, the remote controller 700 can have two or more USB ports 714 and/or HDMI ports 717 for connecting to multiple displays 250 and/or intelligent terminals 240. The pictures can be presented in the manner shown and described with reference to FIGS. 3 and 5.

In FIG. 15, a holder 723 can be provided to be rotatably coupled with the remote controller 700 such that a positioning of the holder 723 can be adjusted. In other words, the holder 723 can be adjusted between a stowed position and a deployed position. The holder 723 can hold one of the intelligent terminals 240 described herein at the deployed position, which intelligent terminal 240 can be connected to the remote controller 700 for presenting the pictures selected via the remote controller 700.

Figure 16:
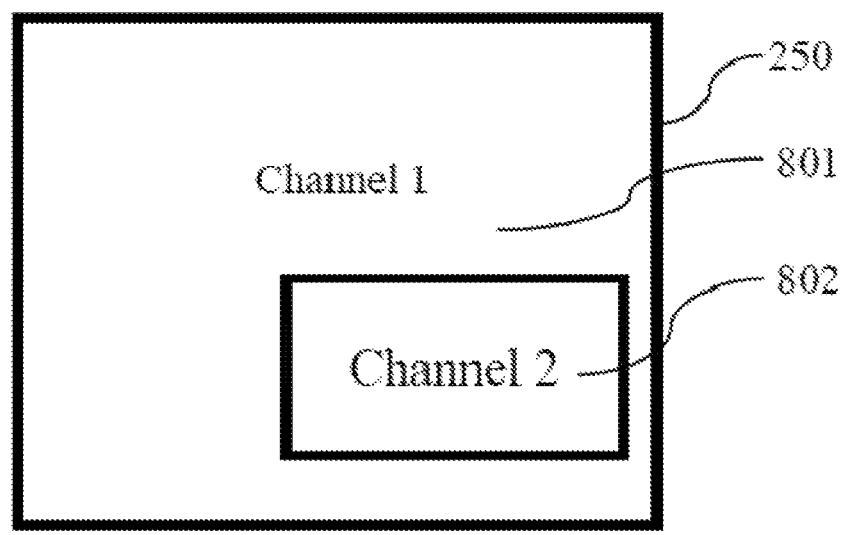
FIG. 16 is an exemplary block diagrams illustrating an embodiment of a presentation format of the display of FIG. 2.

FIG. 16 illustrates an embodiment of a presentation format of the display 250 of the imaging system 100 of FIG. 1. Turning to FIG. 16, two channels of pictures can be presented in a format by which the two windows overlap. In FIG. 16, the two channels of pictures can be presented in a picture-in-picture format, a first channel being presented in a full-screen display area 802 and a second channel being presented in a window 801 that can be a portion of the full-screen display area 802. In some embodiments, a dimension, a shape and/or a location of the window 801 can be adjusted by a user with the remote controller 700 (shown in FIGS. 14 and 15). Contents of the two display areas 801, 802 can be switched by the user.

Figure 17:
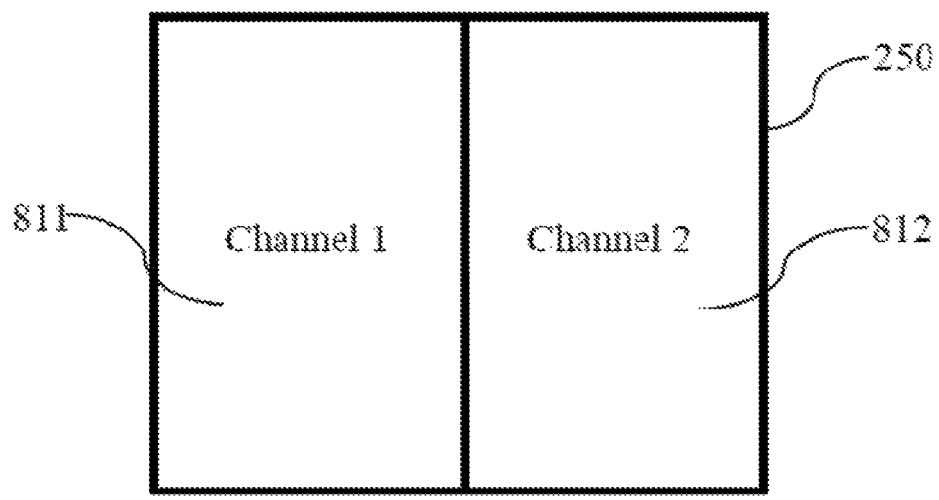
FIG. 17 is an exemplary block diagrams illustrating another embodiment of a presentation format of the display of FIG. 2.

FIG. 17 illustrates an embodiment of an alternative presentation format of the display 250 of the imaging system 100. In FIG. 17, the two channels of pictures can be presented in a format by which the two windows do not overlap. In FIG. 17 the two channels of pictures can be presented in a picture-by-picture format, a first channel being presented in a first screen area 811 and a second channel being presented in a second screen area 812. The two screen areas 811, 812 can be arranged side-by-side. In some embodiments, a dimension, a shape and/or a location of either of the two windows 811, 812 can be adjusted by the user. Contents of the two screen areas 811, 812 can be switched by the user.

Figure 18:
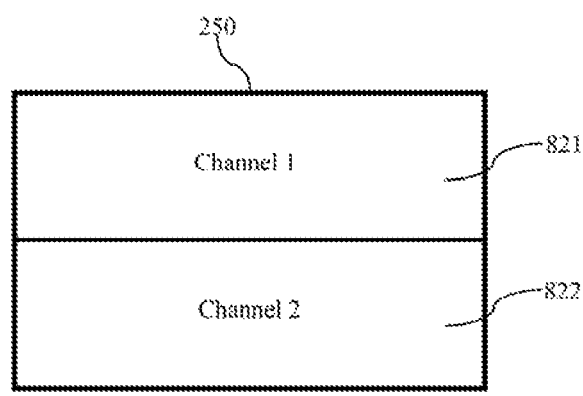
FIG. 18 is an exemplary block diagrams illustrating a third embodiment of still another presentation mode of the display of FIG. 2.

FIG. 18 illustrates another embodiment of an alternative presentation format of the display 250 of the imaging system 100. In FIG. 18, the two channels of pictures can be presented in another format by which the two windows do not overlap. In FIG. 17 the two channels of pictures can be presented in a picture-on-picture format, a first channel being presented in a first screen area 821 and a second channel being presented in a second screen area 822. The two screen areas 821, 822 can be arranged one on top of the other. In some embodiments, a dimension, a shape and/or a location of either of the two windows 821, 822 can be adjusted by the user. Contents of the two screen areas 821, 822 can be switched by the user.

Although shown and described as presenting in three separate formats (shown in FIGS. 16-18) for purposes of illustration only, the display 250 can be switched among the three formats without any restrictions. Although shown and described as being only two channels 208 for purposes of illustration only, the display 250 can present three or more channels 208 with any of the three formats individually or in combination.

Figure 19:
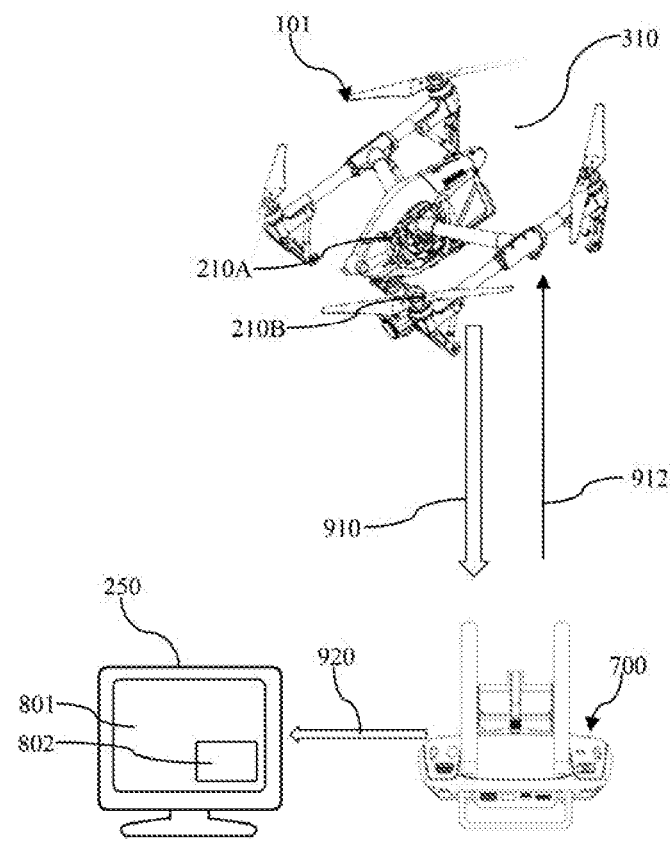
FIG. 19 is an exemplary schematic diagram illustrating an embodiment of an imaging system for operating the aerial platform of FIG. 11.

FIG. 19 illustrates an embodiment of a system 600 for operating an aerial platform 101 of FIG. 11. Turning to FIG. 19, the system 600 can comprise the aerial platform 101, a remote controller 700 and a display 250. In FIG. 19, the aerial platform 101 can be coupled with two imaging devices 210: a first imaging device 210A and a second imaging device 210B. The first imaging device 210A can be a first-person view ("FPV") imaging device and the second imaging device 210B can be a functional imaging device. An aerial node 220 (shown in FIGS. 4 and 11) can be positioned in a fuselage 310 of the aerial platform 101. The aerial node 220 can acquire pictures from the two imaging devices 210A, 210B, encode the pictures to generate two bitstreams 209 (shown in FIG. 1) and transfer the bitstreams 209, via a wireless connection 910, to a remote controller 700.

The controller 700 can serve as a ground node 230 (shown in FIG. 5) and can receive the bitstreams 209, decode the bitstreams 209 to restore the pictures in two channels 208, and transmit the two channels of pictures to the display 250 via a wired and/or wireless connection 920. The two channels of pictures can be presented in a picture-in-picture format with the first channel of pictures being presented in a first screen area 801 and the second channel of pictures being presented in a second screen area 802 or vice versa. Without limitation, the display 250 can also present the pictures in a picture-by-picture format or a picture-on-picture format as shown and described with reference to FIGS. 16-18. The remote controller 700 can control the pictures being presented and the format of the presentation.

Alternatively and/or additionally, the remote controller 700 can be operated by a pilot (not shown) to control the aerial platform 101 and/or at least one of the imaging devices 210A, 210B, including the first and second gimbals 332, 535 (shown in FIGS. 12 and 13) attached. The control signal can be transferred to the aerial platform 101 via a wireless connection 912 that can be part of the first connection 910. The operator can control, e.g., movements of the aerial platform 101 and/or at least one of the imaging devices 210A, 210B via control functionalities shown and described above with reference to FIGS. 14 and 15.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. An aerial imaging system carried by an unmanned aerial vehicle (UAV) for transferring pictures captured from a plurality of imaging devices, comprising:
   an aerial node having a plurality of channels for acquiring the pictures from the imaging devices; and
   a ground node, wherein:
   the aerial node is configured to transfer the pictures;
   the plurality of imaging devices include:
      a first imaging device arranged on the UAV and integrated with a first gimbal configured to control an orientation of the first imaging device, wherein the first imaging device is configured to support navigation and controlling of a movement of the UAV; the first imaging device moves consistently with the first gimbal in response to the first gimbal rotating around a pitch axis of the UAV; and the first imaging device moves consistently with the UAV in response to the first gimbal not rotating around the pitch axis of the UAV; and
      a second imaging device arranged on the UAV and integrated with a second gimbal configured to control an orientation of the second imaging device, wherein the second imaging device is configured to facilitate functional imaging tasks assigned to the UAV; and
   the ground node is configured to present the pictures acquired from both the first imaging device and the second imaging device via a display to guide operation of the UAV.

2. The aerial imaging system of claim 1, wherein the aerial node includes a picture acquiring module configured to acquire the pictures from the channels.

3. The aerial imaging system of claim 1, wherein the aerial node includes a picture encoding module configured to encode the collected pictures from the plurality of channels.

4. The aerial imaging system of claim 3, wherein the picture encoding module is configured to generate a bitstream of pictures for each of the channels.

5. The aerial imaging system of claim 4, wherein the aerial node further includes a wireless transferring module configured to transfer the bitstreams to another node.

6. The aerial imaging system of claim 1, wherein at least two of the pictures collected respectively via at least two of the channels constitute a three-dimensional picture of an object.

7. The aerial imaging system of claim 1, wherein the first imaging device includes a first-person view (FPV) imaging device configured to capture first pictures in a first-person view.

8. The aerial imaging system of claim 7, wherein the captured first pictures support determination of a travel path for the UAV.

9. The aerial imaging system of claim 7, wherein the second imaging device is configured to assist the supporting navigation of the UAV.

10. The aerial imaging system of claim 1, wherein the first imaging device is configured to capture a plurality of first pictures in respective directions from the UAV.

11. The aerial imaging system of claim 1, wherein the second imaging device includes a functional imaging device.

12. The aerial imaging system of claim 1, wherein the first imaging device and the second imaging device are configured to capture first pictures and second pictures, respectively, for a purpose selected from a group consisting of determining a position of the UAV, determining a travel direction, selecting an optimal travel path, and avoiding obstacles.

13. A method for transferring pictures from an aerial platform, comprising:
   acquiring the pictures from a plurality of imaging devices via a plurality of channels; and
   transferring the pictures acquired via at least two of the channels, and wherein the plurality of imaging devices include a first imaging device arranged on the UAV and configured to support navigation and controlling of a movement of the UAV, and a second imaging device arranged on the UAV and configured to facilitate functional imaging tasks assigned to the UAV; and
   presenting the pictures acquired from both the first imaging device and the second imaging device via a display to guide operation of the UAV, wherein:
   the first imaging device is integrated with a first gimbal configured to control an orientation of the first imaging device, and the second imaging device is integrated with a second gimbal configured to control an orientation of the second imaging device; and
   the method further comprises:
      the first imaging device moves consistently with the first gimbal in response to the first gimbal rotating around a pitch axis of the UAV; and
      the first imaging device moves consistently with the UAV in response to the first gimbal not rotating around the pitch axis of the UAV.

14. The method of claim 13, further comprising:
   encoding the pictures for each of the channels.

15. The method of any one of claims 13, wherein acquiring the pictures includes acquiring at least two of the pictures, each from a separate one of the channels and each being part of a three-dimensional picture of an object.

16. An imaging system for an unmanned aerial vehicle (UAV), comprising:
   a plurality of imaging devices arranged on the UAV configured to capture pictures from the UAV;
   an aerial node configured to transfer the pictures captured by the plurality of imaging devices; and
   a ground node; wherein:
   the plurality of imaging devices include a first imaging device arranged on the UAV and configured to support navigation and controlling of the movement of the UAV, and a second imaging device arranged on the UAV and configured to facilitate functional tasks assigned to the UAV, wherein:
      the first imaging device is integrated with a first gimbal configured to control an orientation of the first imaging device, and the second imaging device is integrated with a second gimbal configured to control an orientation of the second imaging device;
      the first imaging device moves consistently with the first gimbal in response to the first gimbal rotating around a pitch axis of the UAV; and the first imaging device moves consistently with the UAV in response to the first gimbal not rotating around the pitch axis of the UAV; and the ground node is configured to present the pictures acquired from both the first imaging device and the second imaging device via a display to guide operation of the UAV.

17. The imaging system of claim 16, wherein the aerial node includes a picture acquiring module configured to acquire the pictures from the plurality of imaging devices via a plurality of channels.

18. The imaging system of claim 17, wherein each of the imaging devices is connected to the picture acquiring module via a separate channel selected from the plurality channels.

* * * * *